(12) United States Patent
Hicks et al.

(10) Patent No.: US 11,992,001 B2
(45) Date of Patent: May 28, 2024

(54) TEXTURED WINDOW FILM

(71) Applicant: Artscape, Inc., Portland, OR (US)

(72) Inventors: Thomas Hicks, Portland, OR (US); Michael Kyne, Portland, OR (US)

(73) Assignee: ARTSCAPE INCORPORATED, Portland, OR (US)

( * ) Notice: Subject to any disclaimer, the term of this patent is extended or adjusted under 35 U.S.C. 154(b) by 0 days.

(21) Appl. No.: 16/410,766

(22) Filed: May 13, 2019

(65) Prior Publication Data
US 2020/0037602 A1 Feb. 6, 2020

Related U.S. Application Data

(63) Continuation of application No. 14/803,001, filed on Jul. 17, 2015, now Pat. No. 10,334,840, which is a (Continued)

(51) Int. Cl.
*A01M 29/08* (2011.01)
*B32B 7/12* (2006.01)
(Continued)

(52) U.S. Cl.
CPC .............. *A01M 29/08* (2013.01); *B32B 7/12* (2013.01); *B32B 27/08* (2013.01); *B32B 27/18* (2013.01); *B32B 27/306* (2013.01); *B44C 1/10* (2013.01); *B44F 1/02* (2013.01); *E06B 7/28* (2013.01); *E06B 9/24* (2013.01); *G02B 5/0221* (2013.01); *G02B 5/0242* (2013.01); *G02B 5/0278* (2013.01); *G02B 5/223* (2013.01); *B32B 2307/4026* (2013.01); *B32B 2307/41* (2013.01); *B32B 2307/412* (2013.01); (Continued)

(58) Field of Classification Search
CPC . A01M 29/08; B32B 7/12; B32B 7/02; B32B 27/08; B32B 27/18; B32B 27/306; B32B 2307/41; B32B 2307/412; B32B 2307/414; B32B 2307/712; B32B 2307/4026; B32B 2307/51; B32B 2307/71; B32B 2419/00; B44C 1/10; B44F 1/02; E06B 7/28; E06B 9/24; G02B 5/0221; G02B 5/0242; G02B 5/0278; G02B 5/223; Y10T 428/24975
See application file for complete search history.

(56) References Cited

U.S. PATENT DOCUMENTS 4,302,260 A * 11/1981 Meltzer .................. B44F 1/063
  156/63
4,318,946 A * 3/1982 Pavone .................. B44F 1/063
  156/63
(Continued)

FOREIGN PATENT DOCUMENTS

WO  WO-02076721 A1 * 10/2002 ............. B42D 15/02

*Primary Examiner* — Nancy R Johnson
(74) *Attorney, Agent, or Firm* — Schwabe Williamson & Wyatt

(57) ABSTRACT

A textured window film has a prismatic effect that allows a substantial amount of incoming light to pass through a window while refracting the light at random or semi-random angles in a manner that distorts viewed images. The result is a window film that is brighter and more vibrant while also providing visual privacy. The textured window film can therefore better simulate real textured and colored glass.

16 Claims, 17 Drawing Sheets

Related U.S. Application Data continuation-in-part of application No. 14/623,830, filed on Feb. 17, 2015, now abandoned, which is a continuation-in-part of application No. 11/833,942, filed on Aug. 3, 2007, now abandoned.

(51) Int. Cl.

| | | |
|---|---|---|
| *B32B 27/08* | (2006.01) | |
| *B32B 27/18* | (2006.01) | |
| *B32B 27/30* | (2006.01) | |
| *B44C 1/10* | (2006.01) | |
| *B44F 1/02* | (2006.01) | |
| *E06B 7/28* | (2006.01) | |
| *E06B 9/24* | (2006.01) | |
| *G02B 5/02* | (2006.01) | |
| *G02B 5/22* | (2006.01) | |

(52) U.S. Cl.
CPC ..... *B32B 2307/414* (2013.01); *B32B 2307/51* (2013.01); *B32B 2307/71* (2013.01); *B32B 2307/712* (2013.01); *B32B 2419/00* (2013.01); *Y10T 428/24975* (2015.01)

(56) References Cited

U.S. PATENT DOCUMENTS

| | | | | |
|---|---|---|---|---|
| 6,030,002 | A * | 2/2000 | Charley | B41M 3/12 283/81 |
| 6,150,007 | A * | 11/2000 | Oshima | B44F 7/00 428/172 |
| 2002/0187314 | A1 * | 12/2002 | Shibata | B44C 1/20 428/195.1 |
| 2004/0140665 | A1 * | 7/2004 | Scarbrough | B44F 7/00 283/95 |

* cited by examiner (BACKGROUND)

(BACKGROUND)

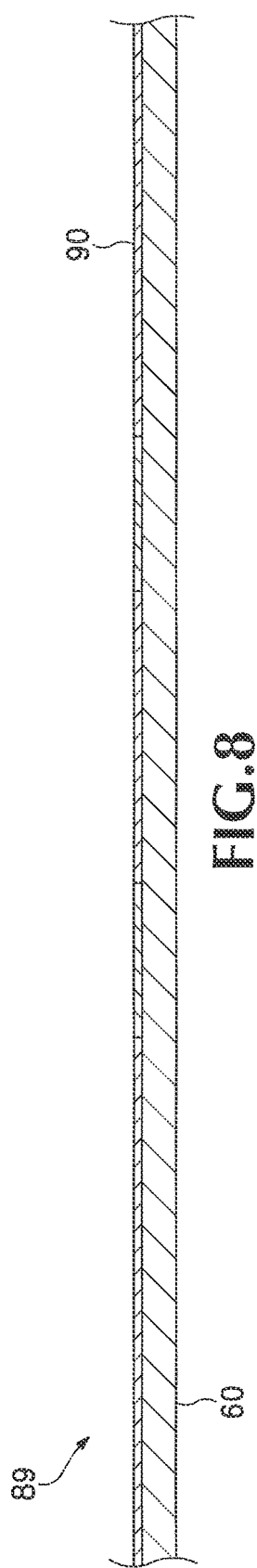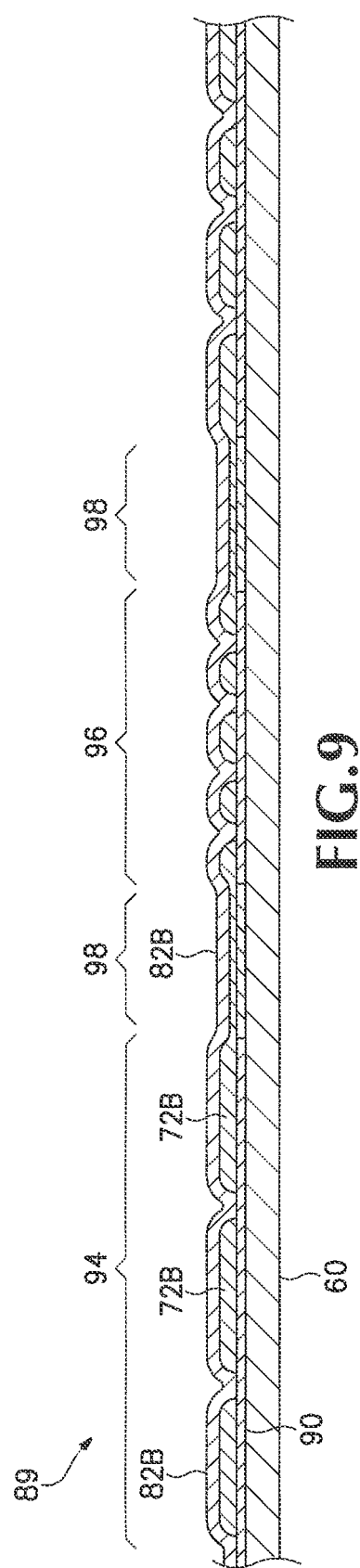

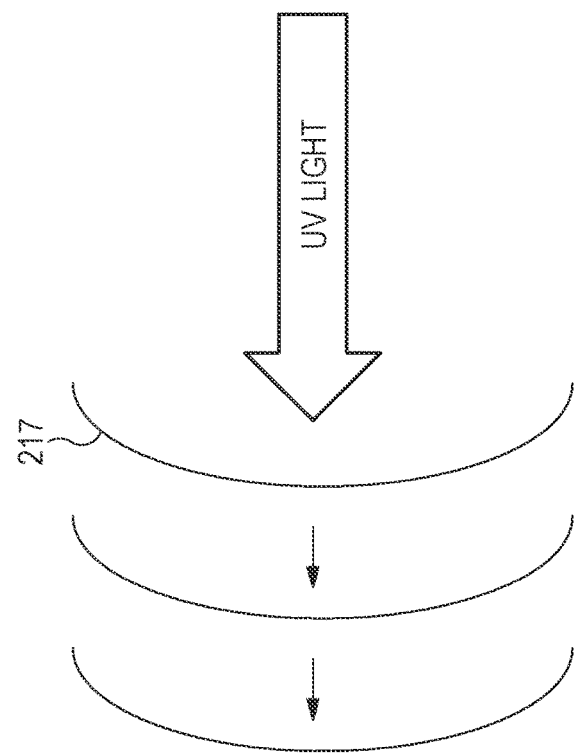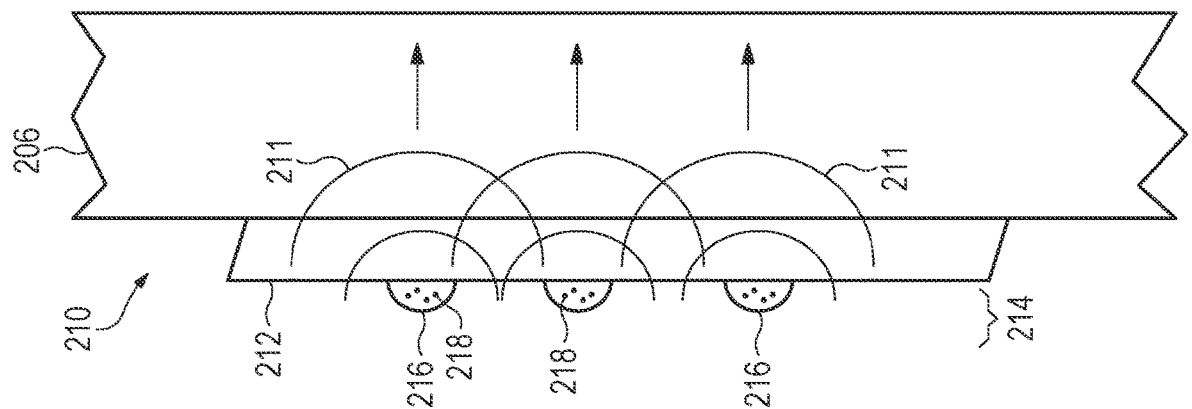
FIG. 16

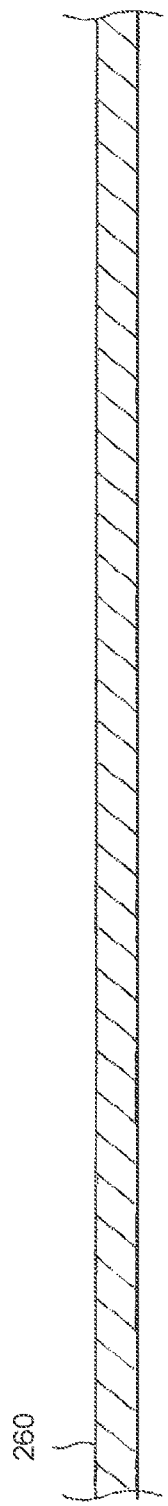
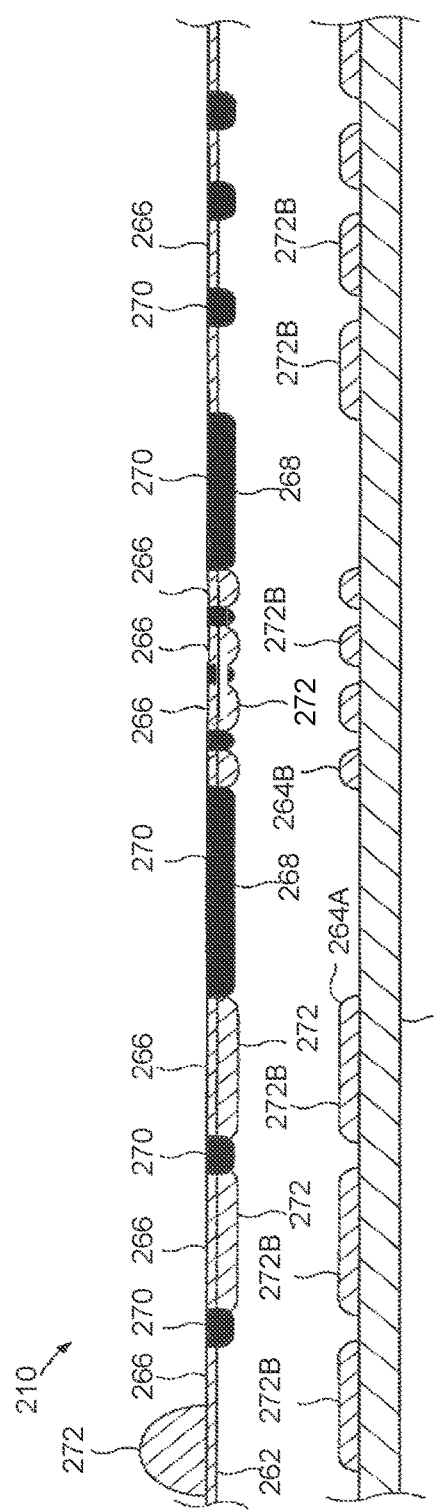
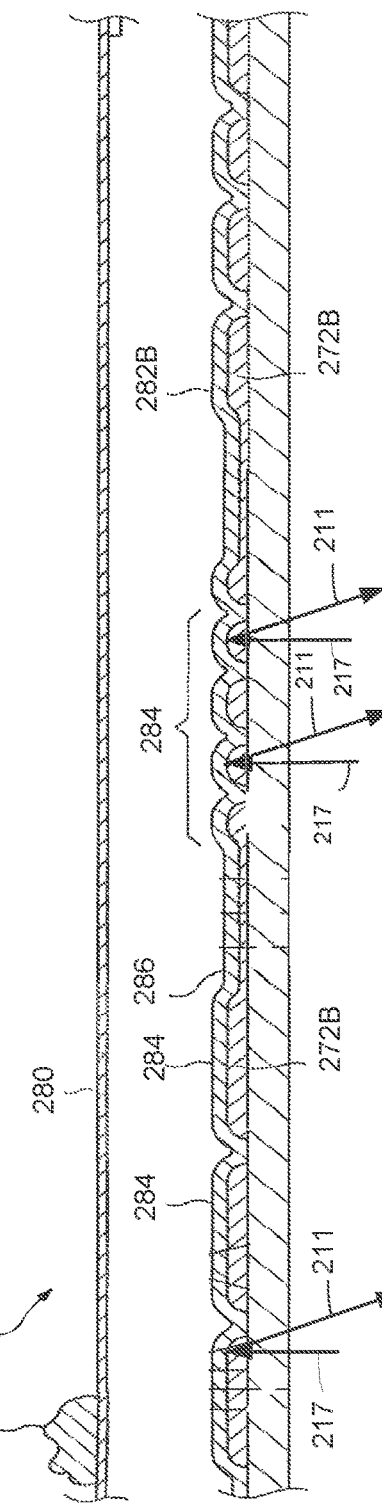
FIG. 22
FIG. 23
FIG. 24

TEXTURED WINDOW FILM

This application is a continuation of U.S. patent application Ser. No. 14/803,001, filed Jul. 17, 2015, which is a continuation in part of U.S. patent application Ser. No. 14/623,830, filed Feb. 17, 2015 entitled BIRD ANTI-COLLISION WINDOW FILM which is a continuation in part of U.S. patent application Ser. No. 11/833,942, filed Aug. 3, 2007, entitled TEXTURED WINDOW FILM, which are all herein incorporated by reference in their entirety. U.S. patent application Ser. No. 10/846,807, filed May 13, 2004, entitled TEXTURED WINDOW FILM is incorporated by reference in its entirety.

TECHNICAL FIELD

This invention relates generally to window films.

BACKGROUND OF THE INVENTION

There are many styles of real textured glass. Real textured glass can include cathedral glass, pot metal glass, architectural glass, hand wrought glass, rolled glass, or any other type of glass that may be modified or manufactured in some way, typically while in a molten state, to produce some sort of textured effect or altered visual impression. Different examples of textured glass styles include pebbled, waved, water glass, etc. The textured surface of the glass provides privacy by distorting images that may be viewed from an opposite side of the window while at the same time allowing a substantial amount of light to pass through the window.

Some real textured glass also provides an additional aesthetic appeal with the use of particular textured shapes and colors. For example, stained glass which comes in a broad range of colors that provide the privacy of textured glass while letting some amount of light to pass through the stained glass window. The stained glass also provides an aesthetic appeal with different combinations of glass colors and glass shapes. However, clear and colored textured glass windows and stained glass windows are expensive to manufacture and install.

Window films are applied to windows to provide privacy. However, current window films do not provide the same visual characteristics provided by real textured glass. Current window films provide privacy by blocking or diffusing a substantial amount of incoming light. For example, current window films may use a cloudy grey or other opaque material that both diffuses and reflects the incoming light.

Unfortunately, these diffusion and reflection characteristics reduce the amount of light that can pass through the window and causes the surface of the window to appear dull and grey. Different colored designs may be printed onto the window film. These light diffusion and reflection characteristics tend to dull the colors and designs applied to the window film further reducing the aesthetic appeal of the window.

In contrast, real textured windows provide privacy by refracting light which distorts images viewed from an opposite side of the window. These refraction characteristics of real textured glass produce a brighter more sparkling window surface that has an increased aesthetic appeal over current window films. One analogy is that the window film provides visual characteristics similar to a light grey plastic cup while real textured glass provides a vibrant visual characteristic more like a crystal glass.

Window films can also be difficult to install. Window films typically use an adhesive on one side to attach to the window. During installation, these adhesive surfaces can stick to each other. This requires the two contacting surfaces to be forcibly pulled apart which can then damage the film surface, for example, by creating cracks, creases or stretch marks. The adhesive surface also prevents the window film from being easily removed or repositioned on the window.

Current window films are very thin increasing the possibility that the adhesive surfaces of the film will bend over and attached onto itself causing more installation problems and also increasing the possibility that the film will be damaged. The thinness and composition of these window films also increase the possibly that the film with retain creases or crack during installation. For example, conventional polyester window films are around 1.0 thousands of an inch (mils) thick.

The present invention addresses this and other problems associated with the prior art.

BRIEF DESCRIPTION OF THE DRAWINGS

FIGS. 8 and 9 show screen printing stages used for a colored textured window film.

FIG. 16 is side sectional view of the bird anti-collision window film.

FIGS. 22-24 show screen printing stages used for creating the bird anti-collision window film.

DESCRIPTION OF THE PREFERRED EMBODIMENTS

A textured window film provides a prismatic effect that allows a substantial amount of incoming light to pass through a window while refracting the light at random or semi-random angles in a manner that distorts viewed images. The result is a window film that produces a brighter more vibrant visual image while also providing visual privacy. In other words, the textured window film simulates the visual effects provided by real textured and colored glass.

Figure 1:
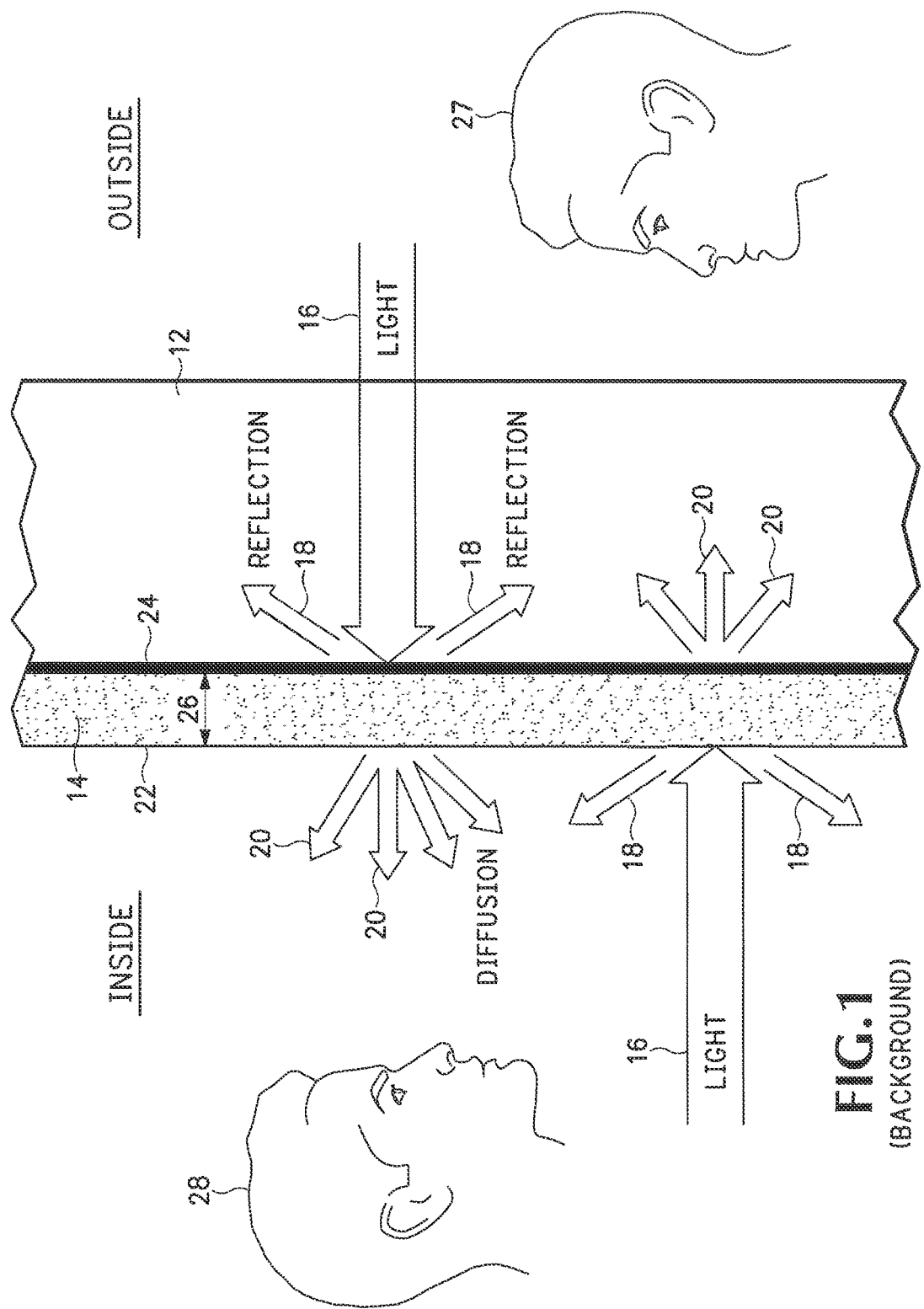
FIG. 1 is a side section view of a conventional window film that diffuses and reflects incoming light.

FIG. 1 shows a conventional window film 14 attached to a window 12. The conventional window film 14 has a flat window contact surface 24, a flat outside surface 22, and a substantially uniform thickness 26. The window film 14 must have a sufficient opaqueness and light diffusion characteristic in order to provide adequate privacy when a person 27 looks through the window 12. The opaqueness of the window film 14 reflects and diffuses light so that person 27 cannot clearly see inside the window 12.

However, this opaque characteristic of window film 14 also cause light 16 to reflect backwards preventing a substantial amount of reflected light 18 from passing through film 14. Any light 20 that does pass through sheet 14 is heavily diffused. Thus the interior of the room will be darker and the surface of the window 12 in many cases will be a dull grey color.

Figure 2:
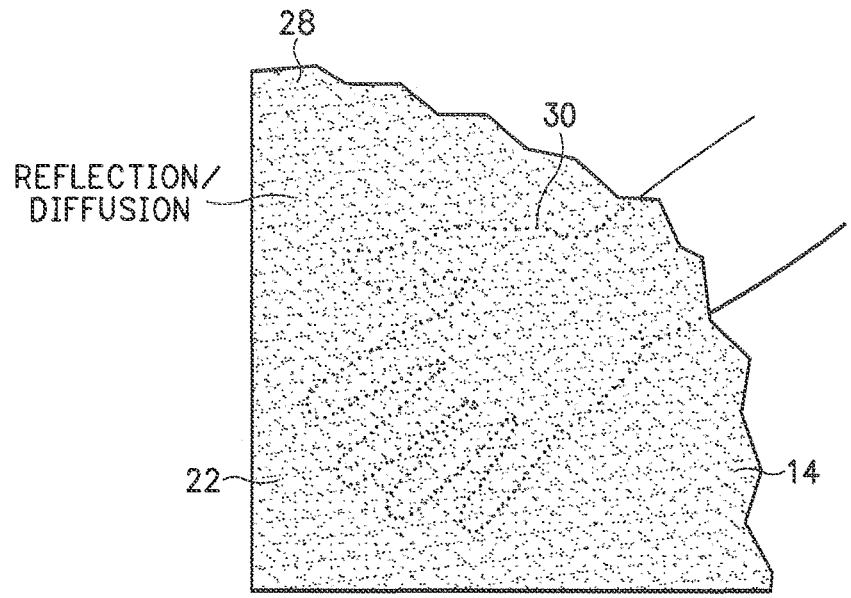
FIG. 2 is a diagram showing how the conventional window film dulls the surface of a window.

FIG. 2 represents the visual effects created by the conventional window film 14. As shown above, in order to provide the desired amount of privacy, the window film 14 has an opaqueness that reflects a substantial amount of light 18 (FIG. 1) and diffuses light 20 (FIG. 1) that passes through the window. These reflection and diffusion characteristics create a generally dull grey visual effect 28 both on the outside surface 22 of film 14 and dulls any images 30 that are viewed through window 12.

Example Embodiments of the Invention

Figure 3A:
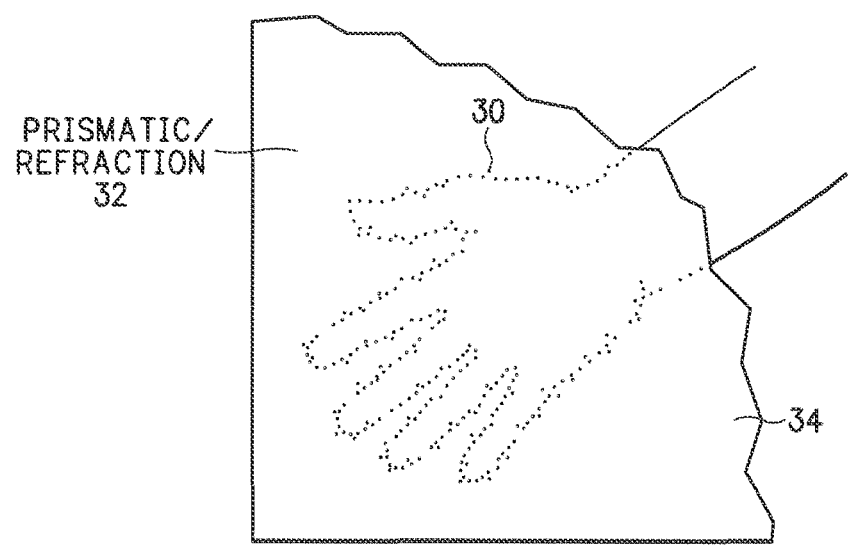
FIGS. 3A and 3B are diagrams showing how a textured window film according to one embodiment of the invention can distort an image while maintaining a bright window surface.
Figure 3B:
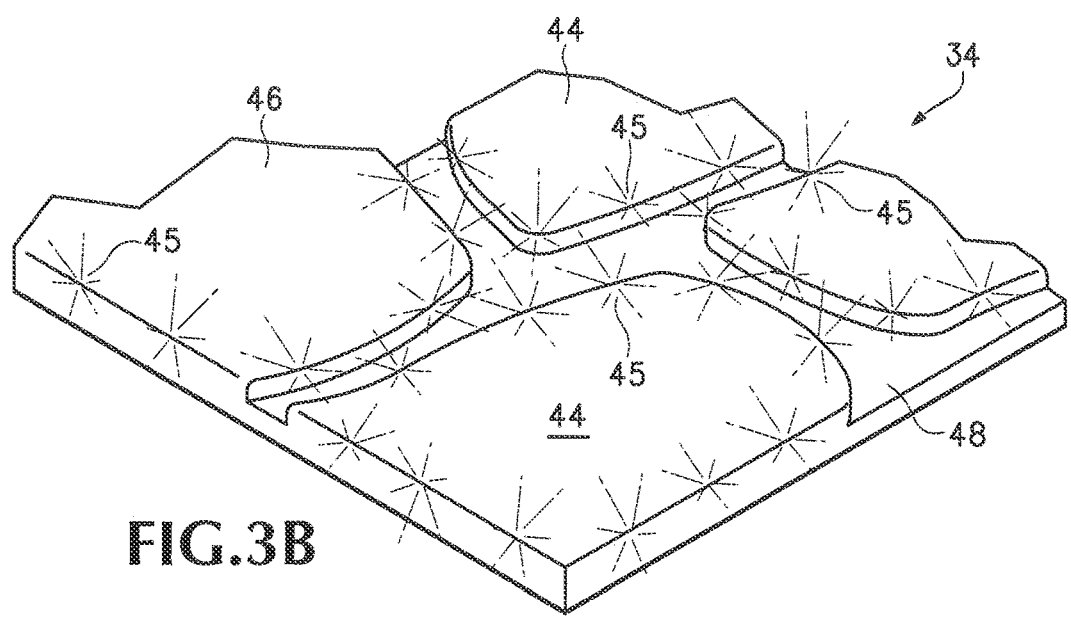

FIGS. 3A and 3B show a prismatic effect 32 created by a textured window film 34 according to one embodiment of the invention. The prismatic effect 32 created by window film 34 allows a significant amount of light to pass through the attached window and film 34. This produces a brighter, more vibrant, and sparkling film surface than the dull surface 22 produced by the window film 14 shown in FIG. 2. For example, light is refracted at different angles off the different contoured surfaces of the textured areas 44 and 46 in FIG. 3B creating the different sparkling effects 45. In addition, there may be some flat areas 48 that allow some limited amount of additional less refracted light to pass through the textured window film 34.

However, a substantial amount of the light that passes through the textured window film 34 is refracted or bent distorting any viewed images. The result is the sparkling visual effect shown in FIGS. 3A and 3B that also maintains a required level of privacy. The textured surface 38 also has the added advantage of making any color or colored pattern that is applied to the window film 34 more vibrant than is possible using the window film 14 shown in FIG. 1.

The textured window film 34 produces a visual effect that more accurately simulates the visual effects created by actual textured glass. However, these simulated visual effects are produced at a fraction of the cost of real textured or colored glass. The textured window film 34 can be applied to any glass surface and is particularly applicable to windows in homes or offices where someone wishes to have some degree of privacy from others looking through the window. Because more light passes through the window, the textured window film 34 provides a brighter more pleasing environment inside the home or building.

Figure 4:
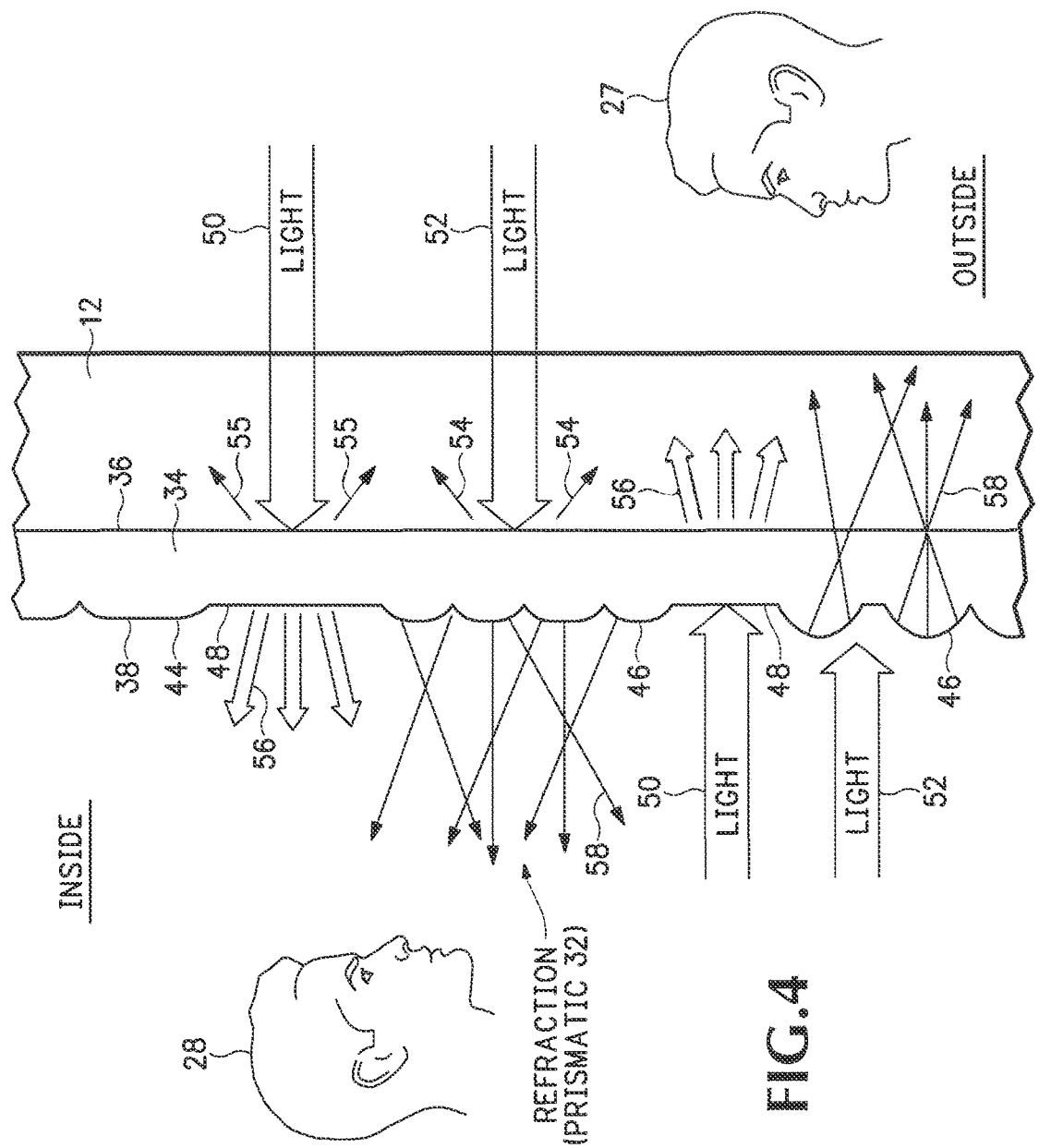
FIG. 4 is an enlarged schematic side section view of the textured window film shown in FIG. 3.

FIG. 4 shows the textured window film 34 in more detail. In one example, an outside surface 38 is textured and an inside window contact surface 36 is substantially flat and smooth so that it can be easily attached to the window 12. In one example, the inside surface 36 is held on the window by cohesion and atmospheric pressure without having to use adhesives. However, this is only one example, and it is also possible to use an adhesive on inside surface 36 to attach the textured window film 34 to window 12.

The textured surface 38 produces the prismatic effect 32 described above in FIG. 3. Light 52 is refracted by the textured surface 38 in a random or semi-random manner that allows a substantial amount of light 58 to pass through both window 12 and window film 34. For example, the amount of light 54 reflected by the textured window film 34 is less than the amount of light 18 reflected by the window film 14 in FIG. 1. Thus, the textured window film 34 allows more light 56 and 58 to pass through the window 12 providing a brighter inside surface on the window 12.

A substantial amount of light coming from inside of window 12 is also refracted. The refracted light distorts images, such as image 28 or image 30 in FIG. 3, when viewed by a person 27 looking from the outside of window 12. This image distortion provides a sufficient amount of privacy without having to use opaque film materials, such as the window film 14 shown in FIGS. 1 and 2.

The textured surface 38 can include different combinations of textured areas 44 and 46 and substantially flat areas 48. The depth and shape of the textured areas 44 and 46 can be varied to create different visual effects. For example, the patterns of the textured areas can be varied to create different textured impressions. For instance, smaller bumps may be used for a more frosted look, while larger bumps may be used for a more pebbled textured look. In another implementation, the bumps may be aligned in rows or some other pattern to simulate flowing or ribbed glass textures or for other architectural design or aesthetic reasons.

In another example, some embodiments of the textured window film 34 may have little or no flat areas 48 while other embodiments may have a substantially larger proportion of flat areas 48. The flat areas 48 may only comprise a small portion of the entire outside textured surface 38. Therefore the flat areas 48 may not be required to provide the same distortion or privacy as the textured areas 44 and 46. The flat areas 48 allow light 50 to pass through with little or no refraction or reflection further increasing the brightness and vibrance of the window film 34.

The flat areas 48 in combination with the textured areas 44 and 46 can operate in a manner similar to window blinds. The textured areas 44 and 46 distort a substantial amount of any image 28 that may be viewed by person 27 from the outside of window 12. The amount of non-distorted light 56 that may pass through flat areas 48 is small enough to maintain the desired amount of privacy. For example, textured areas 44 and 46 operate in a manner analogous to slats in a window blind, while the flat areas 48 operate in a manner analogous to the spaces between the slats. Of course, light cannot pass through the slats in a window blind while the textured areas 44 and 46 allow light to pass through but in the prismatic refracted condition described above.

Multi-Layer Screen Process

One example uses a multi-layer screen printing process commonly known as screen printing for creating the textured window film 34. While a screen printing process is described below, it should be understood that any other screen or non-screen process can be used that produce a textured surface on a window film.

Screen printing is a method of print production where ink is forced through a mesh that is stretched across a frame similar to a screen on a window or door. The mesh can be fabric, synthetic, metal, or another other mesh material. A coating referred to as an emulsion is applied to the mesh that blocks out all areas except the image that is to be printed. Ink is flooded across the screen and forced through the open areas in the mesh with a squeegee. The printing process occurs when the squeegee is pulled across the screen transferring the ink through the open mesh areas onto a substrate.

Figure 5:
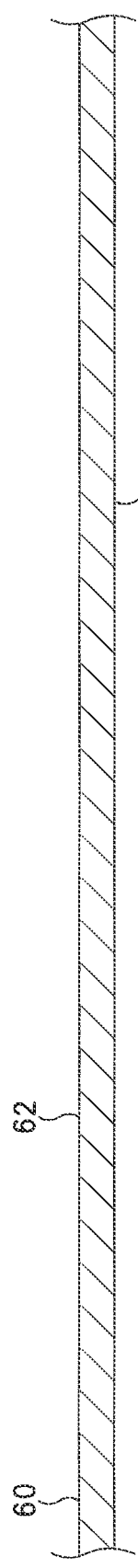
FIGS. 5, 6, and 7 show screen printing stages used for creating the textured window film.

FIG. 5 shows a polymeric film 60 used as a substrate for the screen printing process. The polymeric film 60 can be any type of translucent, transparent, or clear material that can be attached to a window. In one example, the polymeric film 60 is a polyvinyl material that attaches to a window using cohesion and atmospheric pressure. The polymeric film 60 can be any thickness but in one example is anywhere between 0.5 thousands of an inch (mils) and 10 mils. In embodiment, the polymeric film 60 is a transparent and in other embodiments the film 60 may be colored or have varying degrees of opaqueness.

Figure 6:
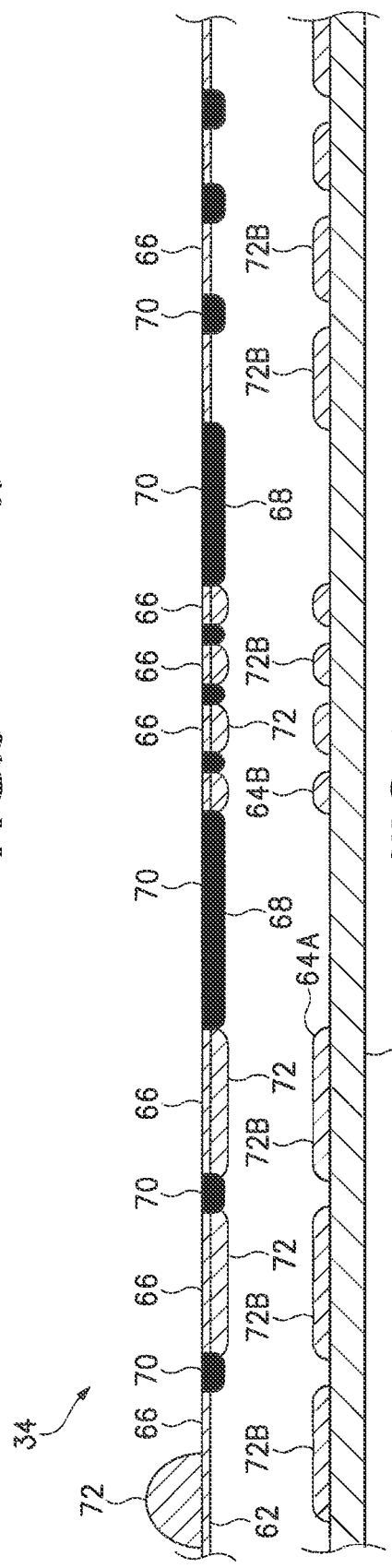

FIG. 6 shows a first stage of the screen printing process. A first screen 62 is used to print a first resin layer 72B on top of the polymeric film 60. A pattern is formed in areas 66 in one example using a photosensitive emulsion 68 that is applied as either a liquid coating or in sheet form. A pattern is applied over the emulsion 68 and the emulsion 68 is then exposed to light. The areas in the emulsion 68 that were covered by the pattern remain soft and are washed out forming open areas 66. The areas 70 not covered by the pattern remain blocked off with emulsion 68.

In a next process, the screen 62 is located over the polymeric film 60 and a resin material 72 is spread over the screen 62. Using a squeegee, the resin 72 is spread through the unblocked areas 66 in screen 62 and onto the top surface of the polymeric film 60 forming resin layer 72B. In one example, the resin material 72 is clear, but other degrees of opaqueness or color can be used.

The size and shape of the individual areas 66 can be relatively consistent or can vary in shape, size or spacing. If the areas 66 have different shapes, then the corresponding bumps 64A and 64B formed in resin layer 72B will also have different shapes. It should be noted that the variable size and shape of the bumps 64A and 64B formed in resin layer 72B help promote the random or semi-random refraction of light as shown above in FIG. 4.

In one example, the same systematic repeating pattern of bumps 64 is repeated for multiple sections of the same window film 34. These bumps can be created in any repeating, random, or semi-random arrangement that refracts light in different directions. This bump pattern can then be used to form visual subpatterns that simulate different textured glass surfaces such as water glass or rippled glass. This is shown in more detail below in FIGS. 12 and 13.

In one embodiment, screen 62 has a thread count in the range of between 65-420 threads per inch and the thickness of the photosensitive emulsion 68 used to coat the screen 62 is anywhere between 1 mil-100 mils. But in the example in FIG. 6, the screen 62 is coated with emulsion 68 to a depth of about 6.0-8.5 mils. The range of 6.0-8.5 mils of emulsion 68 produces a thickness for resin layer 72B of around 1.0-5.5 mils.

In one example, the resin 72 uses acrylated oligomers by weight in a range of about 20-55%. N-Vinyl-2 Pyrrolidone by weight of about 12-25%, and acrylated monomers by weight of about 8-20%. The resin 72 may contain similar elastic and pliability characteristic as the polymeric film 60. This increases the ease in which the window covering 34 can be applied to a window while also increasing durability. Of course this is only one example and other types of resin materials can also be used.

It should be understood that the dimensions and composition of the screen 62, emulsion 68 and resin 72 can all vary and still provide the prismatic effect described above. The specific dimensions and materials used can be changed to created different lighting and application characteristics.

Figure 7:
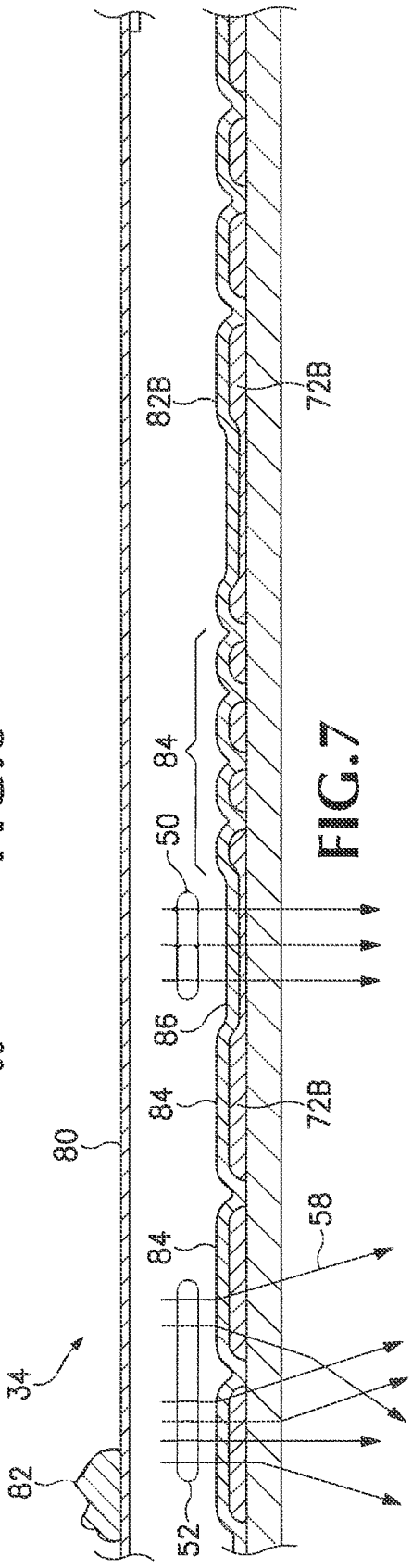

FIG. 7 shows a second screening process that is applied to the textured window film 34. A second screen 80, similar to screen 62 in FIG. 6, is used except that screen 80 does not have a pattern formed from emulsion. In one example, the screen 80 comprises a uniform mesh of between about 110-420 threads per inch and is large enough to cover the entire resin layer 72B. A second resin, clear varnish or clear coat 82 is spread over screen 80 applying a second substantially even resin layer 82B over the first resin layer 72B.

The second resin layer 82B in one embodiment may be less viscous than the first resin layer 72B and may comprise a mixture of TRPGDA by weight in a range of about 20-25%, epoxy acrylate by weight in a range of about 50-56%, HDOCA by weight in a range of about 18-22%, and photoinitiators by weight in a range of about 3-5%. Of course other materials can also be used to form the second resin layer 82B.

The resin layer 82B in one example is clear and produces a "liquid" visual effect similar to that produced in actual clear or semi-clear textured glass. The combination of the first patterned resin layer 72B and the second substantially even thickness resin layer 82B promote the prismatic characteristics on light as described above in FIG. 4. For example, the textured areas 84 refract or bend incoming light 52 so that the refracted outgoing light 58 distorts any viewed images. However, substantially flat areas 86 may create little or no refraction of incoming light 50. The second resin layer 82B can also provide a certain amount of light diffusion that may not be possible using only textured layer 72B.

The textured window film 34 can produce a limitless variety of different visual effects. For example, different textured patterns can be created that simulate different visual effects that exist in actual textured glass. The clear non-colored version of the textured window film 34 can be used in applications where some level of privacy is desired but other fashion characteristics, such as a colored pattern, are not desired.

Color

Another aspect of the invention adds one or more colors to the textured window film. A substantially uniform color can be applied or multiple colors can be applied that have any variety of different patterns. These colored patterns can be used to further simulate different types of colored glass, including stained glass.

FIG. 8 shows one example where an inked layer 90 is applied to a top surface of polymeric film 60. One example uses an offset lithography process to form ink layer 90. However, any other process can also be used to apply an ink layer 90 on the polymeric film 60, such as by using an ink jet printing process or a screen printing process similar to that used for applying the resin layers.

Offset lithography is widely used to produce full color images in mass such as magazines, brochures, posters and books. In the offset lithography example, an image is transferred from a plate wrapped around a cylinder onto the polymeric film 60. The offset lithography process can be used to apply any image, pattern, uniform or non-uniform color, picture, etc. onto the polymeric film 60. The lithography process, breaks down an image into small dots separated into four colors; yellow, magenta, cyan and black known as a four color process. The dots are reproduced onto the printing plate mentioned above. Each color has all the tones necessary to produce a photo quality print in ink layer 90.

In one example, the ink used to form layer 90 is made of an elastic material that has similar elastic characteristics as the polymeric layer 60 and the resin layers 72B and 82B. The elastic characteristics of the ink layer 90 make it more resistant to cracking. It should be understood that the ink layer 90 is optional and other embodiments of the textured window film, such as the textured window film 34 described above in FIGS. 5-7, may not use ink layer 90.

One example of an ink material as described above includes 10-30% by weight Triacrylate Monomer; 10-30% by weight Acrylate Oligomer; 1-5% by weight Hydroxycyclohccyl, 1-Phenyl Kclone; 1-5% by weight 1-Propanone, 2-methyl-1[4-(methylthio) phenyl]-2-(4-morpholinyl)-; 1-5% by weight Photoinitiator; and 1-5% by weight Pentacrythritol Tetraacrylate made by INX International Ink Co., 651 Bonnie Lane, Elk Grove Village, Ill. 60007.

Another ink material uses Monomeric Multifunctional Acrylates; Multi-Functional Acrylate Ester; Benzophenone; Acrylate Ester of Bisphenol-A-Epoxy; Multifunctional Acrylate; Isopropyl Alcohol; Inorganic filler; and Ketone type photo-initiator. Of course are just examples and other types of ink materials could also be used.

FIG. 9 shows the two resin layers 72B and 82B applied on top ink layer 90. The two resin layers 72B and 82B are applied in the same manner described above in FIGS. 5-7. However, in one alternative embodiment, the textured areas 94 and % provided by resin layer 72B may by designed to align with particular colored patterns in ink layer 90.

Figure 10:
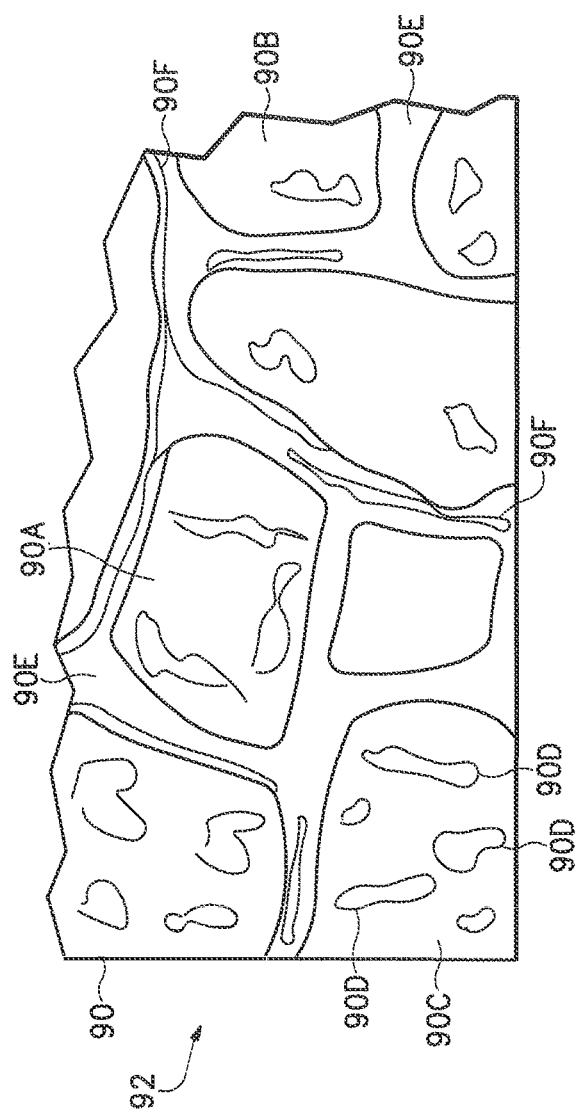
FIG. 10 shows one example of a color design formed in the textured window film.

For example, FIG. 10 shows a stained glass window ink design 92 formed in the inked layer 90 in FIG. 8. In one example, a photograph is taken of an actual stained glass window. The photograph is transferred onto a lithography plate that then transfers the picture of the stained glass window onto the polymeric film 60 as ink layer 90.

In the stained glass window example, a plurality of simulated glass panes in areas 90A, 90B, and 90C have different colors and shapes. For example, area 90A may have a blue glass color, area 90B may have a red glass color, and area 90C may have a green glass color. Of course this is just an example, and any combination of colors and shapes may exist on ink layer 90.

The stained glass colored regions 90A-90C may also have subregions 90D that have different combinations of other colors and shapes with differing degrees of translucence. These colored regions 90D can simulate different imperfections, veins, or variations in shape and coloring inside the primary colored regions 90A-90C.

Other regions 90E may simulate lead or copper extending between the simulated glass regions 90A-90C. In this example, the areas 90E may have a substantially opaque color, such as the grey or black. To further simulate the stained glass visual impression, other locations 90F within the simulated leaded or copper regions 90E may include a lighter, less opaque color, such as a light grey color. The lighter color of areas 90F simulate shading that create a three-dimensional visual impression for the lead or copper frame area 90E.

Referring back to FIG. 9, the textured areas 94 and 96 in resin layer 72B may be aligned with the simulated glass areas 90A-90C shown in FIG. 10. The prismatic effect provided by the textured areas 94 and 96 in combination with the colors provided by area 90A-90C in ink layer 90 combine to enhance the simulated visual impression of stained glass. For example, the refracted light sparkles off the surfaces in areas 94 and % simulating a crystal glass type visual effect.

In one example, area 94 of resin layer 72B may be designed to have larger or different shaped bumps than the bumps provided in area 96. The larger bumps in area 94 can be aligned with a particular colored glass area, such as area 90A while the smaller bumps in area 96 can be aligned with other colored areas, such as area 90B in FIG. 10. This creates different prismatic refraction characteristics for areas 90A and 90B simulating two different colors of stained glass with different textures.

In another embodiment, the substantially flat areas 98 in the resin layer 72B may be aligned with the simulated lead or copper areas 90E shown in FIG. 10. This has the further unique visual effect of further varying the prismatic effect for the different corresponding glass areas 90A-90C while also providing a substantially opaque non-refracted light effect for the simulated leaded or copper areas 90E.

Figure 11:
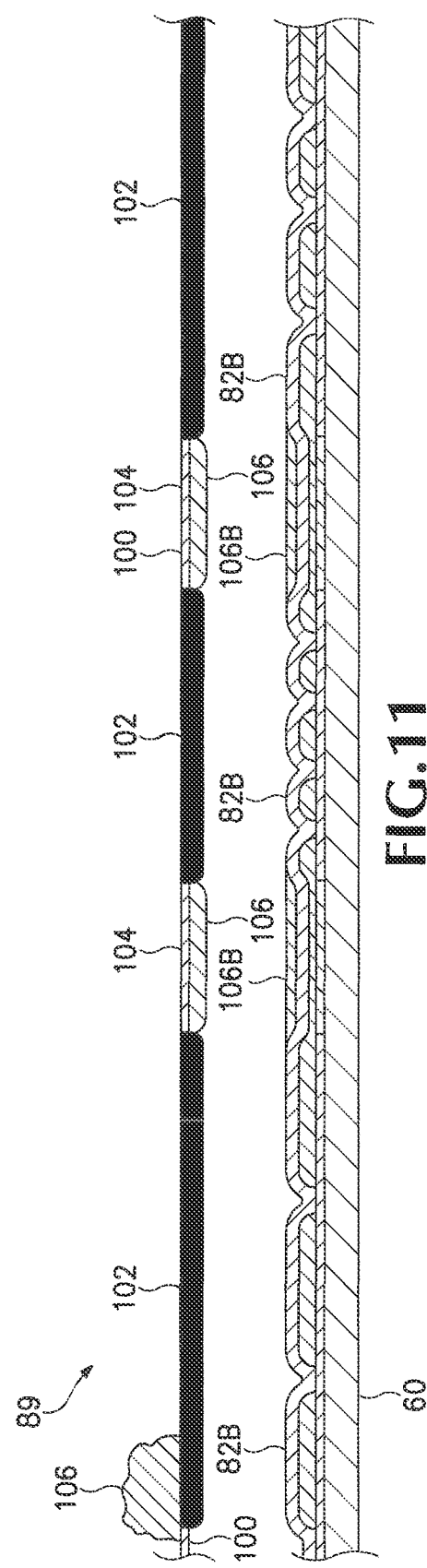
FIG. 11 shows an optional screen printing stage used for the design shown in FIG. 10.

FIG. 11 shows a third screen 100 used for forming another layer 106B on top of resin layer 82B. A photo-sensitive emulsion process is used on screen 100 in a manner similar to that described above in FIG. 6. Emulsion 106 is applied to the screen 100 and a pattern placed over the emulsion 106. The photo-exposed areas of the emulsion block areas 102 of the screen 100 while the emulsion is washed away from the other non-exposed areas 104.

A resin or varnish 106 is spread over screen 100 loading up underneath unblocked screen areas 104 and then depositing as a third layer 106B on top of the second resin layer 82B. In this example, the open screen areas 104 align with the leaded or copper colored areas 90E in FIG. 10. The resin layer 106B in this example has a matte finish that enhances the lead or copper appearance of color areas 90E. Resin layer 106B also serves to fill in some of the recessed areas between the textured areas.

The screen 100 in one example comprises a 380 thread per inch mesh twill weave that forms an emulsion thickness of around 2 mils. However, other mesh thread counts and emulsion thicknesses can be also used.

Figure 12:
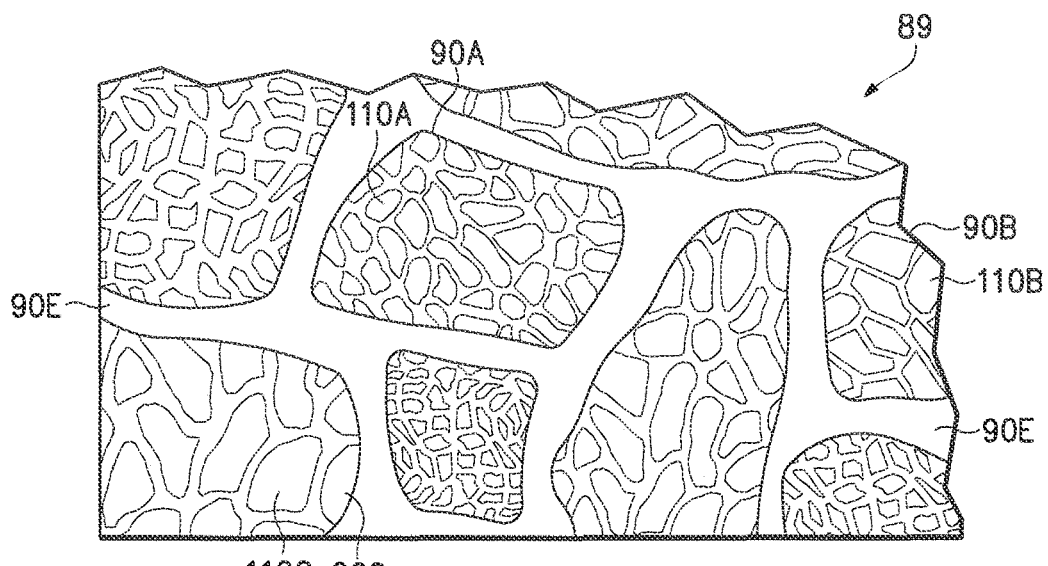
FIG. 12 is a top plan view showing different textures applied to different colored areas of the design shown in FIG. 10.

FIG. 12 is a top plan view showing examples of different textured surfaces that can be produced for the stained glass version of the textured window film 89 shown in FIGS. 8-11 or for the clear or translucent non-colored textured window film shown in FIGS. 3-7. In this example, areas 90A, 90B and 90C have different sizes and shapes of textured bumps 110A-110C, respectively, that each may produce different prismatic refraction effects. The simulated leaded areas 90E have a substantially flat non-textured surface.

In a first pattern forming stage, the shapes of a number of individual textured bumps 110A-110C are designed. A second pattern forming stage may then systematically, semi-randomly, or randomly repeat one or more of these different small sub-patterns of bumps. For example, the same or different patterns for small groups of individual bumps 110A, 110B and/or 110C may be systematically repeated to form the primary stained glass pattern areas 90A-90C. In another example, the glass pattern areas 90A-90C may all be formed from the same sub-pattern of bumps. The final primary pattern shown in FIG. 12 formed from one or more repeated sub-patterns of bumps is then applied to the screen 62 (FIG. 6) using the emulsion pattern process described above.

The repeating sub-patterns and primary patterns on the polymeric film allow multiple sheets of the polymeric film to be seamlessly tiled together. In other words, the repeating textured pattern allow multiple sheets of the film to be attached adjacent to each other to create one continuous textured pattern formed over multiple polymeric sheets.

Figure 13:
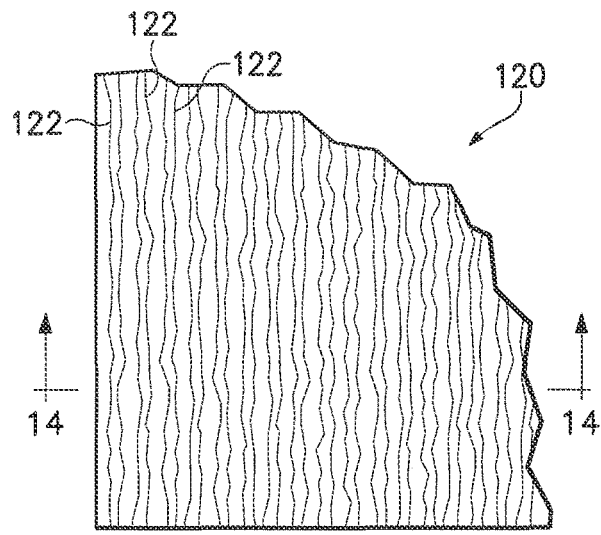
FIGS. 13 and 14 show another texture design for the textured window film.
Figure 14:
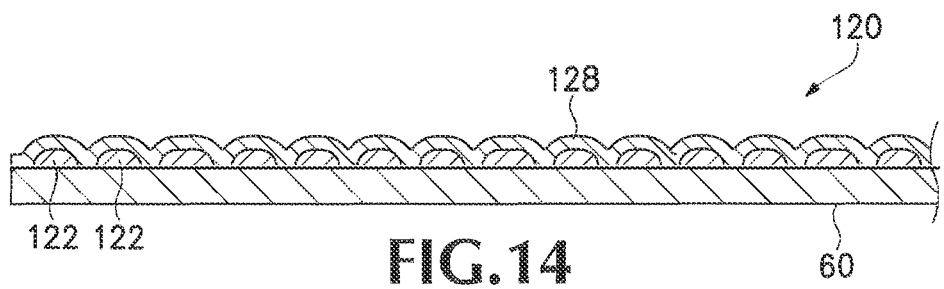

FIGS. 13 and 14 show another example of a textured window film 120 made in much the same fashion as textured window film 34 shown in FIGS. 5-7. In this example, there is no ink layer 90 applied on top of the polymeric film 60. A first clear resin layer 122 is deposited on film 60. The resin layer 122 forms elongated rows or ripples that extend along the entire length of the textured window film 120. A second clear coat layer 128 of substantially uniform thickness is formed over the resin layer 122 similar to resin layer 82B in FIG. 6.

The following summarizes design parameters used for some specific textured window films.

| Style | | Mesh | Emulsion |
|---|---|---|---|
| Color/clear | Textured Layer 122 | 86 | 8 mils |
| line 120 | Second Layer 128 | 195 | 2 mils |
| Mosaic 89 | Textured Layer 72B | 110 | 6.5 mils |
| | Second Layer 82B | 305 | 2.0 mils |
| | Lead line Layer 106B | 390 | 2.0 mils |
| Cross Hatch | Textured Layer 72B | 110 | 6.5 mils |
| | Second Layer 82B | 195 | 2.0 mils |

The mesh values refer to a number of threads per square inch. The emulsion values refers to the thickness of emulsion applied to the screen. For example, the thickness of emulsion 68 in FIG. 6 used to form the textured layer 72B for the mosaic design is around 6.5 mils. The thickness of the emulsion varies the thickness of the resin layer applied over the openings in the emulsion. Thus, the thicker the emulsion, the thicker the following resin layer.

The processes described above are only examples of a combination of textures that are created on the polymeric film. It should also be understood that limitless combinations of screens, emulsion and resin materials can be used to create any of these different textured surfaces. For example, the different patterns on the screen meshes, the thread counts (mesh count) on the screen meshes and the thickness of the emulsions and resins applied to the screens can all be varied to create different textured patterns and different thicknesses and shapes of the resin forming the individual bumps in the textured surface.

A screen with a lower thread count per inch produces a coarser mesh that allows more of the resin to pass through onto the polymeric substrate. This can produce different shapes and heights of the bumps produced on the textured surface. These different bump heights in combination with the textured surface pattern and any ink pattern applied during the process can create a limitless combination of prismatic characteristics in the window covering that result is different lighting and visual effects.

It should also be understood that any combination of opaqueness, textured designs and colors can be used m the textured window films to provide any desired combination of visual effects. For example, the polymeric film 60, ink layer 90, resin layer 72B or 122, resin layer 82B or 128, and resin layer 106B may have any combination of different degrees of opaqueness to provide more or less reflection, diffusion, and refraction.

Installation

Another advantage of the process described above is the ease that the textured window film can be applied to and removed from a window. For example, the smooth/flat contact surface 36 (FIG. 1) in combination with the polymeric material used for the substrate 60 allows the window film to be applied without the use of adhesive materials. The window film is held to the window surface by cohesion and atmospheric pressure. While this is one embodiment, other embodiments of the textured window covering can apply an adhesive material to the window contact surface.

In one embodiment, a paper or polyester liner (not shown) is applied to the smooth side 36 of the polymeric film 60 so that it can be rolled and packaged for commercial sale. The paper liner is held to the polymeric film by the same cohesion and atmospheric pressure that is used to hold the window film to a window.

The liner used with the textured window coverings is easier to remove from the back of the polymeric film than the liners used with other window films. Other window films include a backing that has to be removed from the film using water, razor blades, tape, or some other prepatory procedures. To install the textured window film, the paper is simply pealed off the flat surface of the polymeric film 60 and the film pressed against a wet or dry glass surface. No additional surface preparation is generally required however in one embodiment soapy water is applied to the window film surface or to the window during application to reduce air bubbles. The textured window covering can be easily cut using scissors or a knife to create any desired shape.

The textured window film in one embodiment is thicker than conventional widow films. This makes the textured window film more resilient to bending and creasing and in general makes the material easier to work with. The polymeric substrate and resin layers in combination with any applied ink also have a flexible and stretchable characteristic that further prevent the film from cracking and otherwise being damaged during application or removal from a window. The materials described above for forming the textured window film also do not require any special cleaning process. Thus, conventional window cleaners can be used for cleaning the window film.

In one embodiment, the ink and texture designs used in the window film allow separate sheets to be tiled together. For example, the texture design, ink design, or a combination of both, is generated with a repeating pattern so that two sheets of the same pattern can be attached to the same window adjacent to one another and produce a continuous seamless visual effect.

Ultra-Violet (UV) inhibitors can be applied to any portion of the manufacturing process. For example, UV inhibitors can be applied in the polymeric substrate, or can be added to any of the resin layers or ink layer applied to the substrate.

Scent

A scent can be mixed with the top layer of the textured window film. For example, in FIG. 7, the resin 82 can be mixed with a fragrance to provide a pleasing aromatic effect to the textured window film 34. The scent in one example makes up 0.5%-3% of the weight of the resign 82. The scent is inert so that it does not effect the chemical composition of the resin 82. The resin 82 is applied over the first resin layer 72B in the same manner described above in FIG. 7.

Bird Anti-Collision Window Film

Buildings are using larger windows. For example, the outside of many buildings are made up almost entirely of windows. Many single family homes, as well as high rise condominiums, have large widows or sliding glass doors that take up most of the surrounding wall space. The windows may reflect light from surrounding outside habitat.

The birds are fooled by the reflections and fly into the windows causing injury or death. The number of birds that collide into windows has reached epidemic levels with bird mortality rates in the United States due to window collisions reported at around 1,200,000,000 per year.

To prevent bird collisions, some building owners have placed decals on the outside of the windows to disrupt the reflected images. However, these decals have limited success preventing bird collisions. Chances of even moderate success require attaching a large number of the decals to the outside of the window.

The outside of windows may have restricted access. For example, windows may not open or may be located high above the ground. Applying decals on the outside of these windows is difficult, expensive, and/or dangerous. Large numbers of decals placed on the outside of windows also reduce overall building aesthetics and have reduced operating life due to exposure to outside weather conditions.

Figure 15:
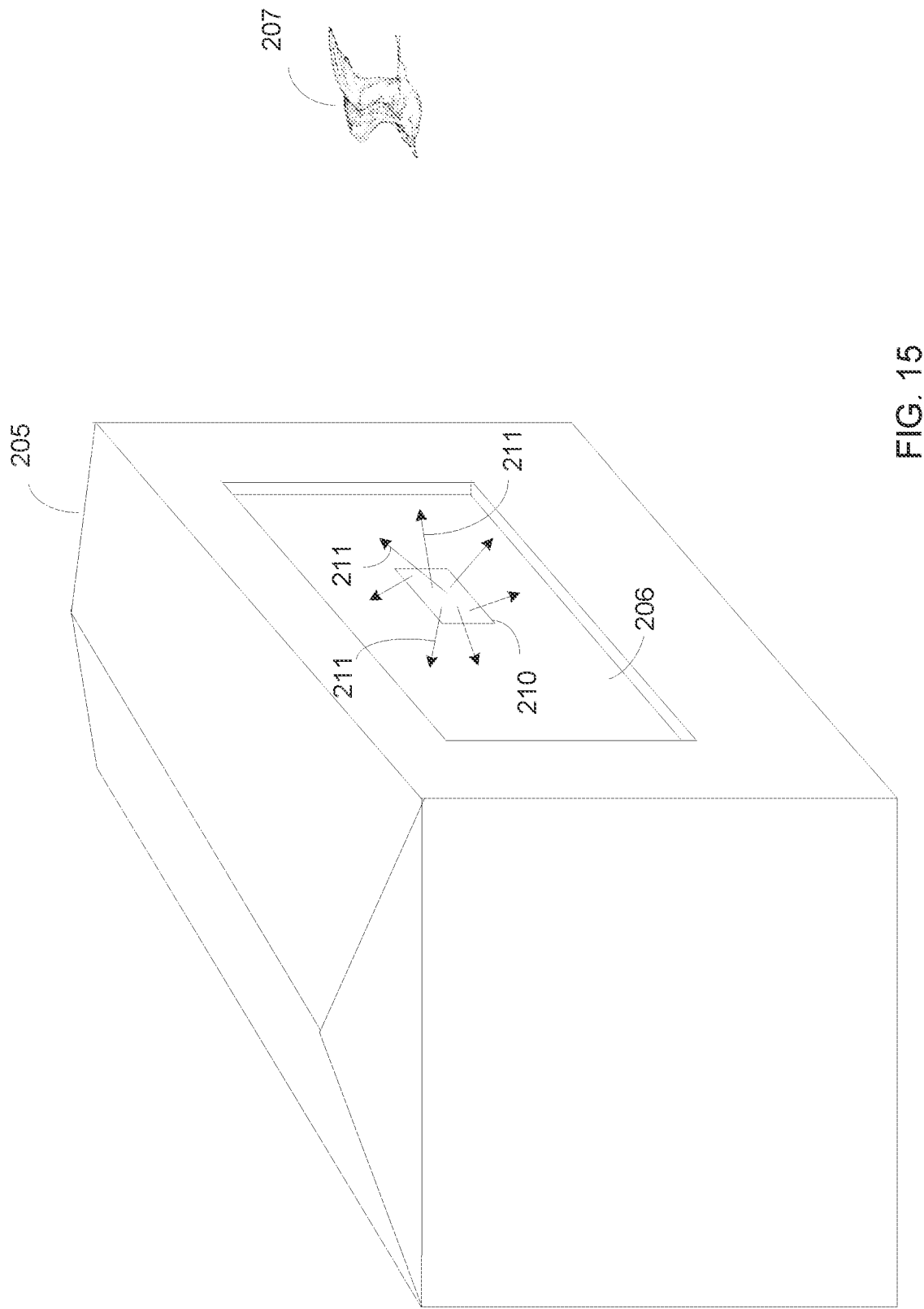
FIG. 15 is a perspective view of a bird anti-collision window film.

FIG. 15 shows a bird anti-collision film 210 attached to the inside of a window 6 installed in a building 205. This is just one example and window 206 may comprise a sliding glass door or any other transparent material located in any home, building, or any other structure. Window 206 may reflect images of habitat that exist outside of building 205. For example, the light reflected by window 206 may appear as part of landscape, trees, mountains, etc. A bird 207 flying in the direction of building 205 may mistake the reflection as part of the outside habitat and unintentionally fly into window 206.

Anti-collision film 210 either reflects or absorbs light coming from outside of building 205 and emits light back out through window 206, thereby, disrupting the image that a bird would see 211. Disrupted light 211 includes, but is not limited to, light absorbed and then emitted back out by anti-collision film 210. For example, anti-collision film 210 may absorb a range of ultra-violet (UV) light that is visible by bird 207. The UV light absorption reduces some of the reflection normally visible by bird 207. Anti-collision film 210 then reemits light as fluorescence at a wavelength range believed to be highly visible by bird 207.

The fluorescence output from anti-collision film 210 is within a wavelength fully visible by bird 207 but only partially visible by humans. Disrupted light 211 therefore creates a substantial visual disruption for bird 207 while at the same time creates a much less noticeable visual disruption to humans. The result is that a relatively small amount of anti-collision film 210 substantially reduces bird collisions and at the same time is hardly noticeable to humans thus minimally impacting the overall aesthetics of window 206.

A building owner may attach anti-collision film 210 to the inside of window 206 providing the additional advantages of increased reflective light disruption and active fluorescing while also providing easy application and insulation from external weather conditions. The decreased reflection and increased absorption/emission of light 211 means a smaller amount of anti-collision film 210 can be used compared with conventional window decals.

For example, anti-collision film 210 may comprise a 4 inch by 4 inch square and one or only a few of the relatively small square anti-collision films 210 may provide enough visual reflective disruption for a relatively large window 206. The reduced number and/or size of anti-collision films 210 further improve aesthetics on the inside and outside of window 205 while also reducing cost.

FIG. 16 shows a section view of anti-collision film 210 in more detail. Film 210 includes a first relatively flat base layer 212 and a second textured layer 214 that in one example comprises different patterns of bumps or other protuberances 216. In one example, bumps 216 in textured layer 214 include a first relatively flat surface contacting base layer 212 and curved or partially round side and back surfaces extending up from base layer 212.

In one example, base layer 212 may comprise a polymeric film and textured layer 214 may comprise a layer of resin applied over polymeric film 212. In another example, base layer 212 may comprise a layer of resin applied over a polymeric film and textured layer 214 may comprise a second layer of resin applied over resin layer 212. These are just examples and anti-collision film 210 may include additional combinations of resin and polymeric films.

In one example, a fluorescent dye 218 is mixed in with the resin of textured layer 214. The description below refers to additive 218 as a fluorescent dye but may include any material, such as an optical brightener, that absorbs and then fluoresces light. As mentioned above, fluorescent dye 218 may absorb a first UV wavelength range and fluoresce at a second wavelength range. UV light 217 absorbed by fluorescent dye 218 may be within a visual light range of birds reducing a certain amount of UV reflection from window 206. Fluorescing light 211 emitted by fluorescent dye 218 is believed to further disrupt other light reflected from window 206.

One example of fluorescent dye is Uvitex OB NSICH221 manufactured by Nazdar Ink Technologies, 8501 Hedge Lane Terrace, Shawnee, Kans. 66227. Another example of fluorescent dye 218 is Benetex® OB Plus made by Mayzo, Inc. 3935 Lakefield Court, Suwanee, Ga. 30024. The chemical name is 2,2'-(2,5-thiophenediyl)bis(5-tert-butylbenzoxazole) with empirical formula $C_{26}H_{26}N_2O_2S$. In one example, 4-15% fluorescent dye 218 by weight in the resin used for textured layer 214 have been shown to create disrupted light 211 that significantly reduces bird collisions. In one example, fluorescent dye 218 has a 93% transmittance for a peak wavelength of around 440 nanometers (NM).

Another type of fluorescent dye 218 mixed with textured layer 214 or mixed with any of the other layers of anti-collision film 210 is: 2,5-Bis(5-tert-butyl-2 benzoxazolyl) thiophene (CAS Number: 7128-64-5 Product Number: B1554), Product Number B1554, manufactured by Tokyo Chemical Industry Co., Ltd (TCI) America, 9211 North Harborgate Street, Portland, Or 97203.

It is believed that bumps 216 in textured layer 214 may further increase the absorption of light 217. For example, the additional surface area provided the flat front surface and rounded side and rear surfaces of bumps 216 may expose the fluorescent dye 218 to more light 217 from multiple different directions. For example, bumps 216 may radially emit fluorescence and light 211 out from anti-collision film 210 at multiple different directions and angles. The wider emission pattern of light 211 may create a larger more noticeable disruption in reflections from window 206.

Figure 17:
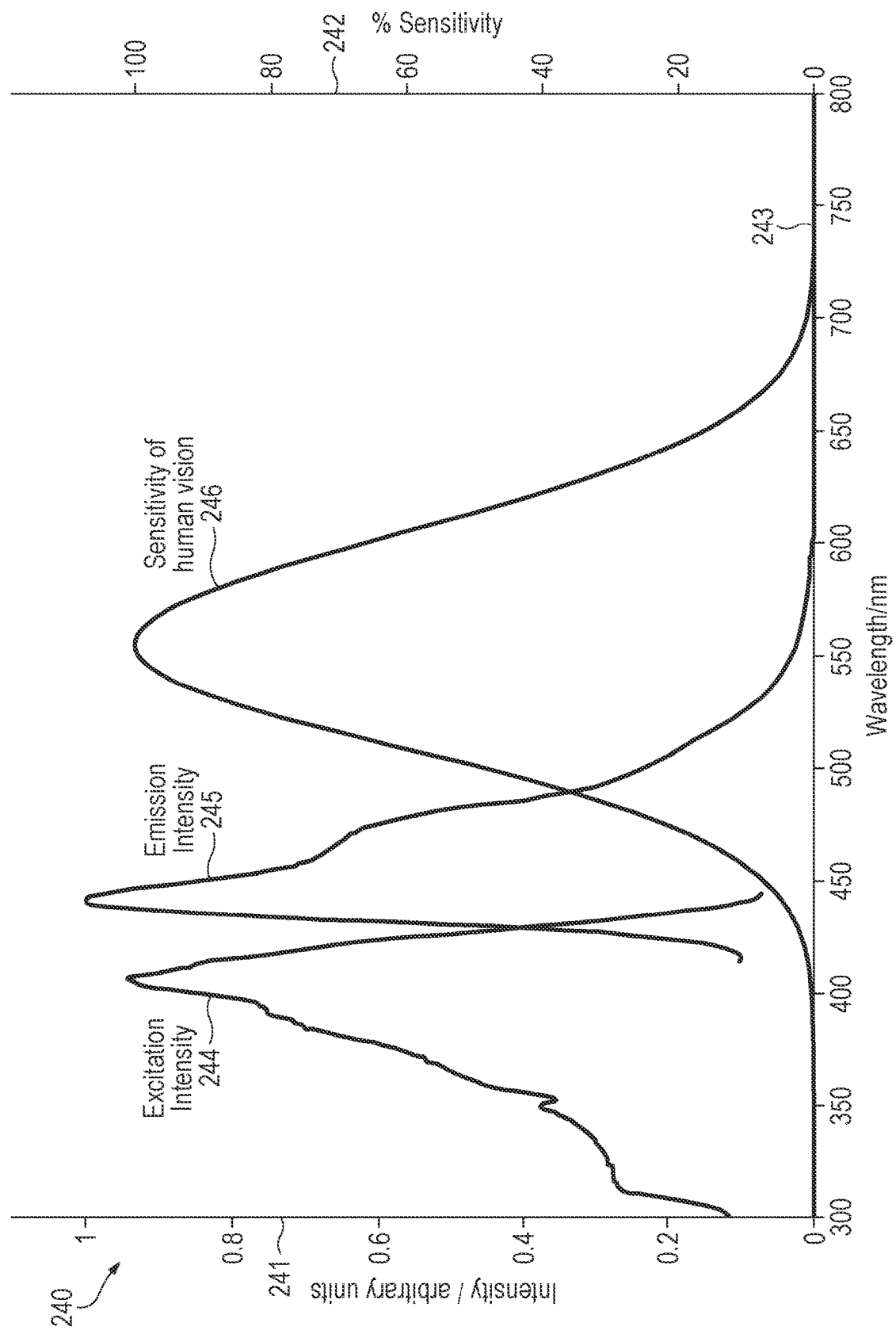
FIG. 17 is a graph showing light wavelength ranges absorbed and emitted by the bird anti-collision film.

FIG. 17 shows spectroscopic data for a range of light absorbed (excitation) and the light emitted (emission) by the anti-collision film. Graph 240 includes a horizontal axis 243 that represents different light wavelengths. A first vertical axis 241 represents a relative intensity of light absorbed, emitted, or reflected by the anti-collision film. A second vertical axis 242 represents a percentage of human sensitivity to different light wavelengths.

Curve 246 shows that humans are sensitive to a light range between around 400 nanometers (nm) and 725 nm.

For example, humans only slightly detect light between 400 nm and 450 nm and highly detect light centered around 550 nm.

Curve 244 shows the excitation intensity (light absorbance) and curve 245 shows the emission intensity (fluorescence) of anti-collision film 210 described above. The peak at around 410 nm in curve 244 represents a peak light absorption by anti-collision film 210 for a particular fluorescent dye and the peak around 450 nm in curve 245 is the intensity of light emitted by anti-collision film 210.

Bird vision extends well into the ultraviolet range and is near maximum sensitivity at 450 nm whereas human vision as shown by curve 246 is only about 7% of maximum sensitivity at 450 nm. To birds, anti-collision film 210 may present a bright blue glow spreading out in all directions across the window surface disrupting the reflection of habitat from the associated window. However, to humans, anti-collision film 210 may only appear as a faint white pattern on the window surface creating only marginally noticeable emission intensity 245.

Figure 18:
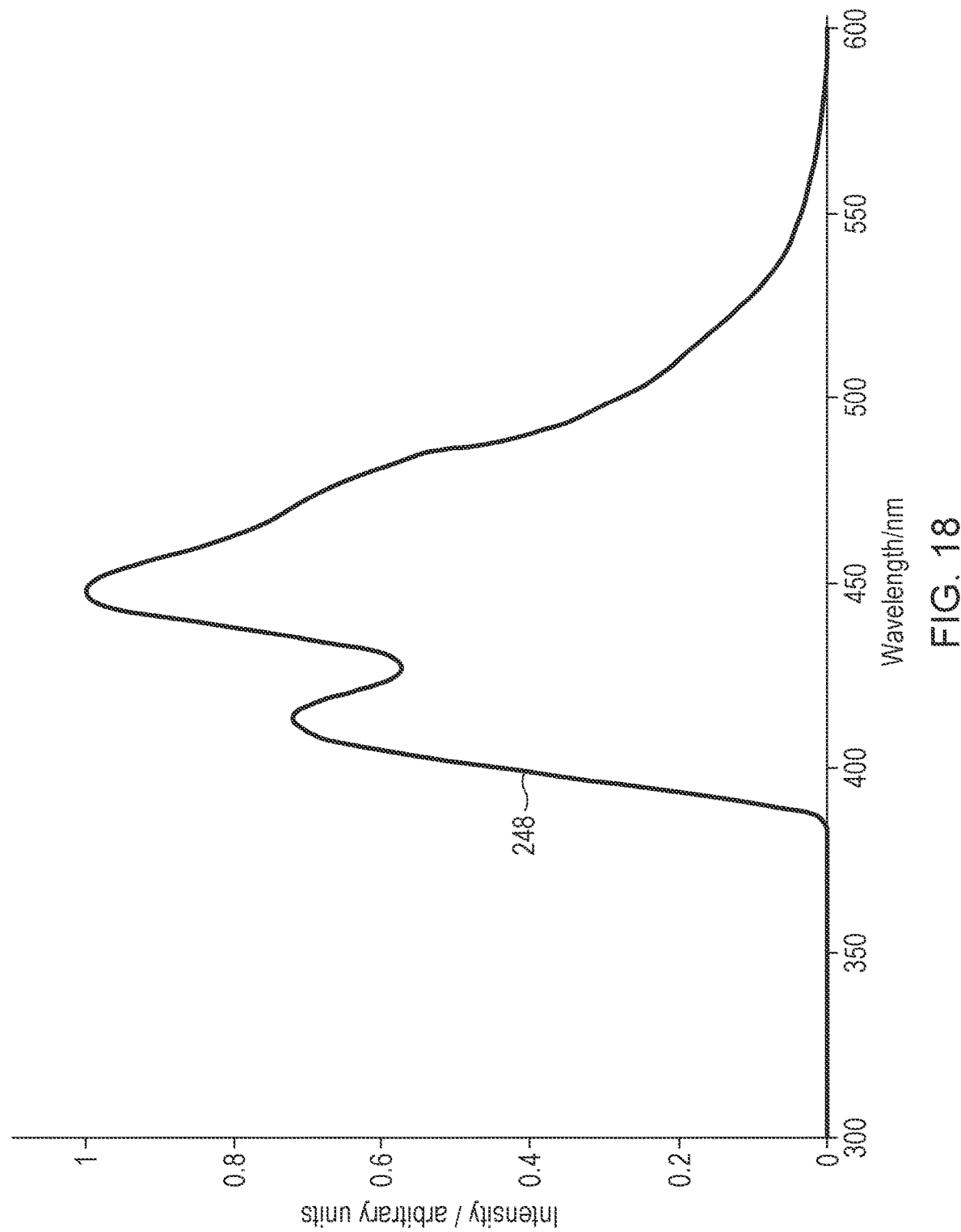
FIG. 18 is a graph showing the relative intensity of light reflected and emitted by the bird anti-collision film when the wavelength of the incident light is 410 nm.

FIG. 18 shows results of 410 nm light striking the front side of a window with the anti-collision film 210 affixed to the back side of the window. The horizontal axis represents light wavelengths and the vertical axis represents relative measured light intensity. The peak at 410 nm in curve 248 is the result of incident light reflecting off the surface of the glass and the peak at 440 nm is the result of light emitted by anti-collision film 210. Curve 248 shows that the anti-collision film 210 radiates more light back out at 450 nm than the amount of light reflected back from the window at 400 nm. Thus, fluorescence from the anti-collision film 210 substantially disrupts reflections viewable by birds.

Figure 19:
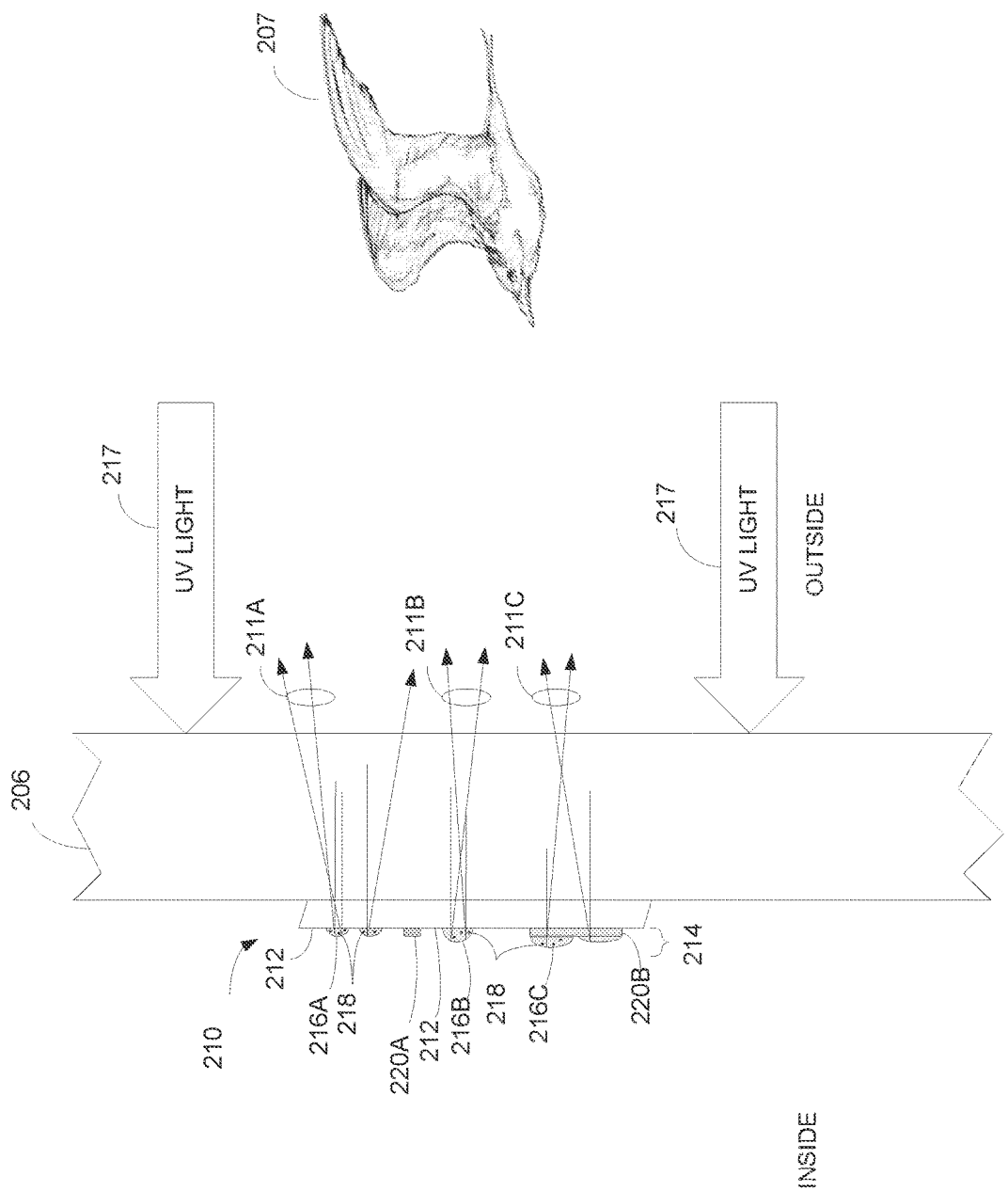
FIG. 19 is another side sectional view of the bird anti-collision window film.

FIG. 19 shows the cross-section of anti-collision film 210 in more detail. Bumps 216A, 216B, and 216C may form separate line patterns on base layer 212. The line patterns may form separate rows, columns, circles, curves, squares, or any other shape. The line patterns formed by bumps 216A. 216B, and 216C are spaced apart by substantially flat surfaces of layer 212. The spaced apart line patterns may create separate discontinuous light groups 211A, 211B, and 211C that further disrupt any images normally reflected by window 206.

Different ink layers 220A and 220B may be printed onto base layer 212 and/or textured layer 214 to further disrupt visual reflections from window 206. For example, ink layer 220A is printed onto a portion of base layer 212 with no textured layer 214 and ink layer 220B is printed onto another portion of base layer 212 underneath textured layer 214. In another example, ink layers 220 may be printed over both textured layer 214 and base layer 212. In other examples, ink may be mixed into the resin of base layer 212 and/or textured layer 214. Ink layers 220 may form any combination of colors and/or patterns and may create additional discontinuities in reflected and refracted light 211.

In one example, UV absorbing inhibitors are mixed into or printed onto base layer 212 or ink layers 220. The amount of UV inhibitors may be restricted to some optimal amount that enables fluorescent dye 218 to absorb substantial UV light within a first bird visible light range and then fluoresce at a substantial intensity at a second light range. In one example, it was discovered that restricting UV inhibitors in anti-collision film 210 to around 35%-45% of UV light create substantial fluorescence from fluorescent dye 218.

Figure 20A:
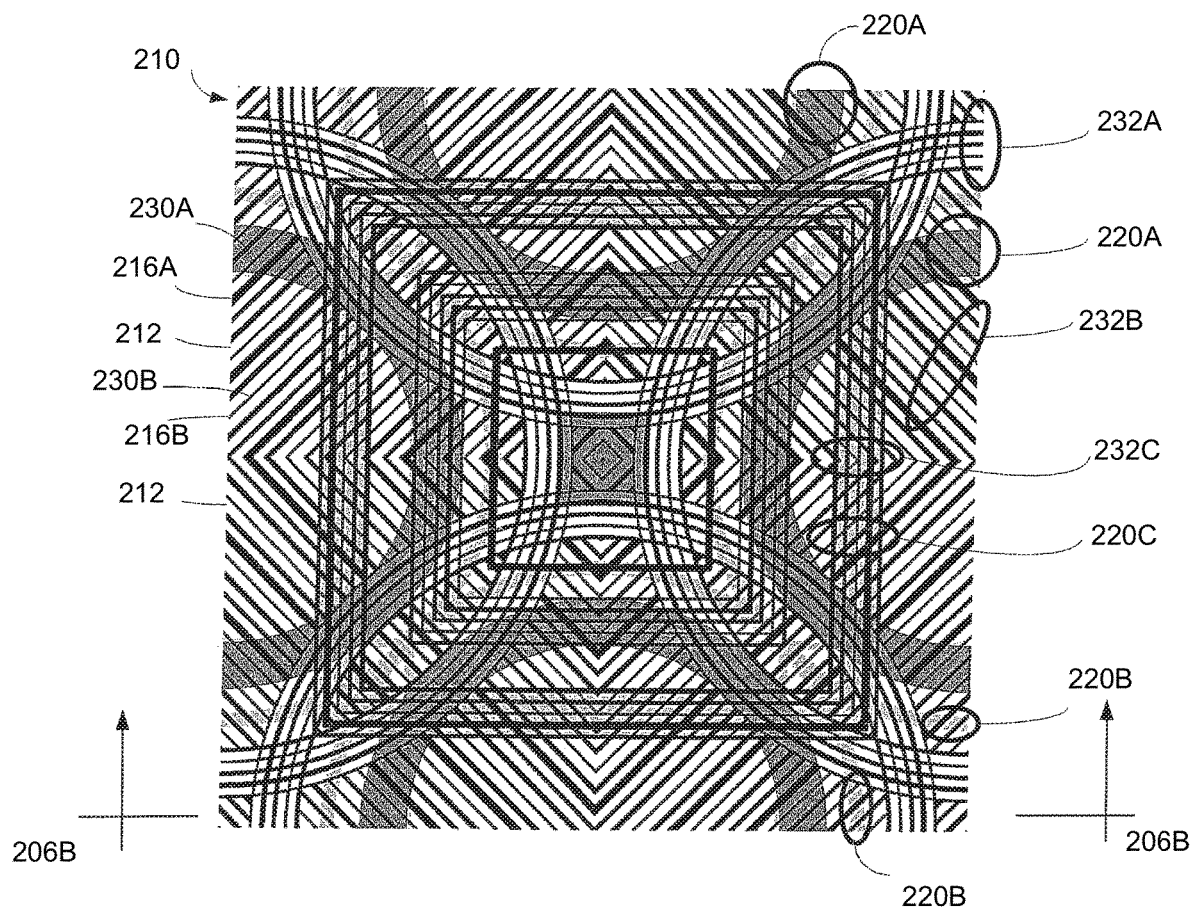
FIGS. 20A-B are a front view of a line patterns used in the bird anti-collision window film.
Figure 20B:
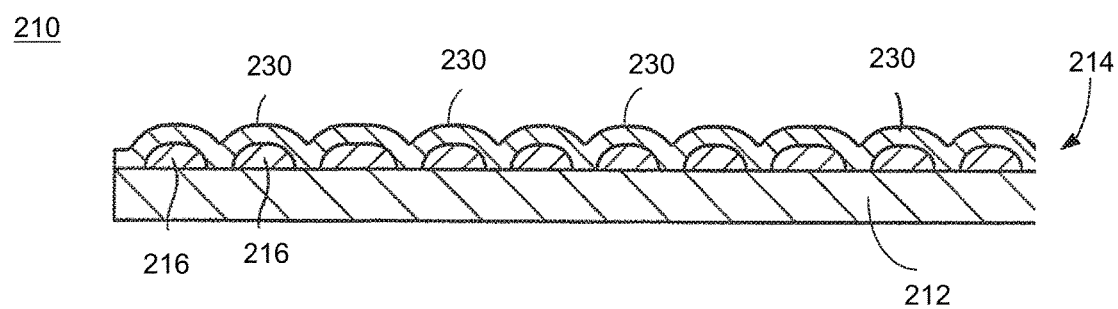

FIG. 20A shows one example of textured lines 230 formed in bird anti-collision film 210. White spaces in FIG. 20A represent a top surface of base layer 212 and black lines 230 represent lines of bumps 216 formed in textured layer 214 on top of base layer 212. FIG. 20B shows a cross-section of anti-collision film 210 in FIG. 20A.

Lines 230 on layer 212 are formed into different widths, shapes, and patterns. For example, a series of bumps 216A may form a relatively wide first line 230A on base layer 212 and a second series of bumps 216B may form a relatively narrow line 230B on base layer 212. In one example, some of lines 230 form curved semi-circular patterns 232A of varying radiuses and orientations. Other lines 230 form square patterns 232B of varying sizes. Other lines 230 may form square patterns 232C of varying line widths and sizes oriented 90 degrees from square patterns 232B. These of course are just examples of any combination of raised textured line patterns that may be formed on base layer 212.

Different ink layers 220 are printed with different patterns on base layer 212. For example, a first blue ink layer 220A is printed in semi-circular patterns in different orientations on layer 212. A second yellow ink layer 220B is printed in semi-circular patterns in different orientations on layer 212. Another yellow ink layer 220C is printed in a square pattern underneath and matching textured square pattern 232C. These of course are also just examples of any combination of ink layers 220 and colors that can be printed in any combination of patterns on base layer 212 and/or textured layer 214.

Ink layers 220 may be printed on any combination of layers 212 and 214. For example, a first ink layer 220 may be printed on base layer 212, a second link layer 220 may be printed over both textured layer 214 and base layer 212, and a third color may be added as a pigment to base layer 212 or textured layer 214.

Textured spaced apart lines 230 increase discontinuities between radiating and non-radiating sections of light absorbed and emitted by film 210. As mentioned above, the w % bite areas in FIG. 20A represent base layer 212 and may include a UV absorbing material and the black lines 230 represent textured layer 214 and may include a UV fluorescent dye. In another example, some of ink layers 220 may include a UV absorbing material or fluorescent dye. The UV absorption by base layer 212 and/or ink layer 220 in combination with the light absorption and subsequent fluorescence by fluorescent dye in textured layer 214 may further increase optical discontinuities in the light reflected, absorbed and emitted by anti-collision film 210.

Ink layers 220 may use a dichroic pigment to create prismatic disruptions. For example, one of ink layers 220 may appear as a rose color when viewing film 210 from a first angle outside of a window and the same ink layer 220 may appear as a more cayenne color when viewing anti-collision film 210 from a different angle outside of the window.

Figure 21:
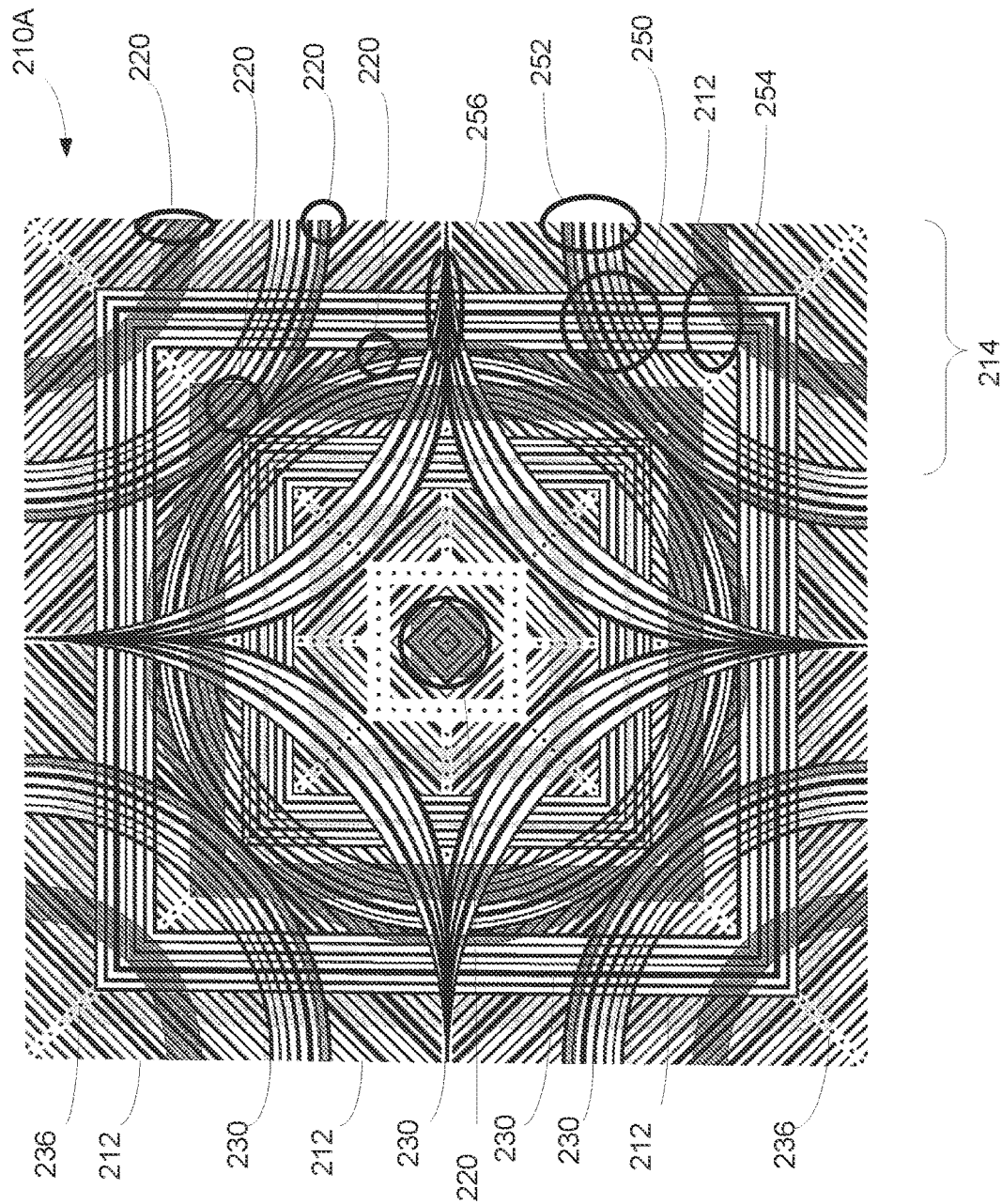
FIG. 21 is a front view of another line pattern used in the bird anti-collision window film.

FIG. 21 shows another bird anti-collision film 210A that uses different line patterns. Lines 230 and dots 236 are again formed in textured layer 214 on top of a polymeric film base layer 212 similar to film 210 in FIGS. 20A and 20B. Ink layers 220 may include other combinations of colors and/or patterns.

It was discovered that certain areas within anti-collision film 210A may fluoresce more than other areas. For example, a cross-hatched textured area 250 formed by intersecting curved lines 252 and straight lines 254 may fluoresce more than a substantially solid textured area 256. Areas 250 and 256 in textured layer 214 may have equivalent amount of fluorescent dye. However, it is believed that spaces between lines 252 and 254 formed by base layer 212 may enable the fluorescent dye in area 250 to absorb more UV light than solid textured area 256 (see FIG. 16). Thus, even though area 256 may have the equivalent or more fluorescent dye per square millimeter than area 250, the unique combination of multiple spaced apart raised rounded surfaces formed by lines 252 and 254 may produce more fluorescence.

The different three-dimensional shapes formed by textured lines 230 are believed to create a lens-like effect that magnifies the reflected and emitted light in a wider pattern more disruptive to reflections observable by birds. The different optical properties of texture layer 214 combined with the fluorescence produced by the fluorescent dye create additional visual disruptions further reducing bird collisions.

Multi-Layer Screen Process

One example uses a multi-layer screen printing process commonly known as screen printing for creating bird anti-collision film 210. While a screen printing process is described below, it should be understood that any other screen or non-screen process can be used that produce a textured surface on a window film.

FIG. 22 shows a polymeric film 260 used as a substrate for the screen printing process. In one example, polymeric film comprises non-textured base layer 212 described above and can be any type of translucent, transparent, or clear material that can be attached to a window. In one example, polymeric film 260 is a polyvinyl material that attaches to a window using cohesion and atmospheric pressure. Polymeric film 260 can be any thickness but in one example is anywhere between 0.5 thousands of an inch (mils) and 10 mils. In embodiment, polymeric film 260 is transparent and in other embodiments film 260 may be colored or have varying degrees of opaqueness as described above.

FIG. 23 shows a first stage of the screen printing process. A screen 262 is used to print a first resin layer 272B on top of polymeric film 260. A pattern is formed in areas 266 in one example using a photosensitive emulsion 268 that is applied as either a liquid coating or in sheet form. A pattern is applied over emulsion 268 and emulsion 268 is then exposed to light. For example, one of the patterns shown in FIGS. 20A-B or 21 may be applied over emulsion 268. The areas in emulsion 268 that were covered by the pattern remain soft and are washed out forming open areas 266. Areas 270 not covered by the pattern remain blocked off with emulsion 268.

In a next process, screen 262 is located over polymeric film 260 and a resin material 272 is spread over screen 262. Using a squeegee, resin 272 is spread through unblocked areas 266 in screen 262 and onto the top surface of polymeric film 260 forming resin layer 272B. Resin layer 272B forms textured layer 214 and associated bumps 216 and lines 230 described above. In one example, resin material 272 may include fluorescent dyes 218 described above. In other examples resin material 272 is clear or includes other degrees of opaqueness or color.

The size and shape of individual areas 266 can be relatively consistent or can vary in shape, size or spacing as shown above in FIGS. 20A-B and 21. If areas 266 have different shapes, then the corresponding bumps 264A and 264B and associated lines 230 formed in resin layer 272B will also have different shapes and sizes. For example, areas 266 and bumps 264A and 264B may form both areas 250 and 256 shown in FIG. 21. As noted above, the variable size and shape of the bumps 264A and 264B formed in resin layer 272B in combination with spaced areas 266 may produce effective optical properties as well as the absorption and resulting emission of light.

In one embodiment, screen 262 has a thread count in the range of between 65-420 threads per inch and the thickness of the photosensitive emulsion 268 used to coat screen 262 is anywhere between 1 mil-100 mils. But in the example in FIG. 23, screen 262 is coated with emulsion 268 to a depth of about 6.0-8.5 mils. The range of 6.0-8.5 mils of emulsion 268 produces a thickness for resin layer 272B of around 1.0-5.5 mils.

In one example, resin 272 uses acrylated oligomers by weight in a range of about 20-55%, N-Vinyl-2 Pyrrolidone by weight of about 12-25%, and acrylated monomers by weight of about 8-20%. Resin 272 may contain similar elastic and pliability characteristic as polymeric film 260. This increases the ease in which film 210 can be applied to a window while also increasing durability. Of course this is only one example and other types of resin materials can also be used. The specific dimensions and materials used can be changed to created different lighting and application characteristics.

As mentioned above, 2%-15% by weight of textured layer 272B may include a fluorescent dye. Textured layer 272B with the fluorescent dyes reflects, and/or bends incoming light 217 so that the outgoing light 211 distorts reflected images.

FIG. 24 shows a second screening process applied to anti-collision film 210. A second screen 280, similar to screen 262 in FIG. 23, is used except screen 280 does not have a pattern formed from emulsion. In one example, screen 280 comprises a uniform mesh of between about 110-420 threads per inch and is large enough to cover the entire resin layer 272B. A second resin, clear varnish or clear coat 282 is spread over screen 280 applying a second substantially even resin layer 282B over first resin layer 272B.

Second resin layer 282B in one embodiment may be less viscous than the first resin layer 272B and may comprise a mixture of TRPGDA by weight in a range of about 20-25%, epoxy acrylate by weight in a range of about 50-56%, HDOCA by weight in a range of about 18-22%, and photoinitiators by weight in a range of about 3-5%. Of course other materials can also be used to form the second resin layer 282B. In one example, resin layer 282B also may include a UV inhibitor. However, as explained above, the UV inhibitor may be limited to something less than 40% to optimize fluorescence by the fluorescent dye.

Color

Figure 25:
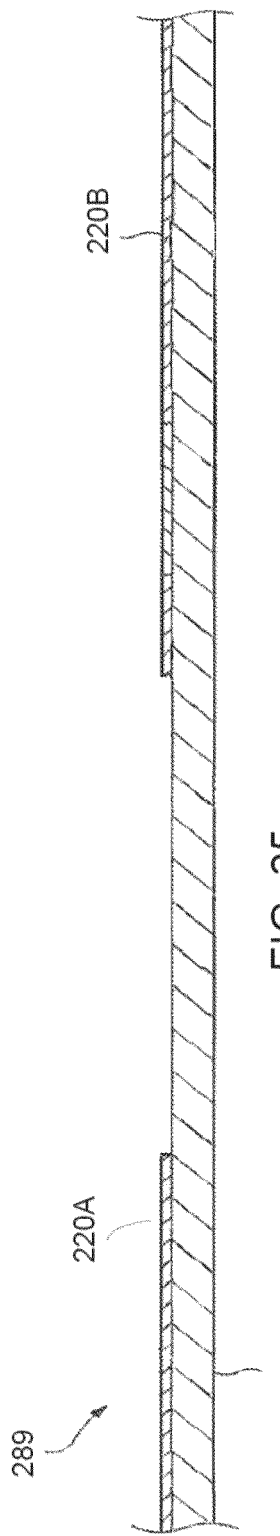
FIGS. 25 and 26 show screen printing stages used for a colored bird anti-collision window film.

FIG. 25 shows one example where ink layers 220A and 220B are applied to a top surface of polymeric film 260. One example uses an offset lithography process to form ink layers 220. However, any other process can also be used to apply ink layers 220 on the polymeric film 260, such as by using an ink jet printing process or a screen printing process similar to that used for applying the resin layers.

In one example, ink used to form ink layer 220 is made of an elastic material that has similar elastic characteristics as the polymeric layer 260 and the resin layers 272B and 282B. The elastic characteristics of ink layers 220 make it more resistant to cracking. Ink layers 220 are optional and other embodiments of the textured window film, such as the textured window film 210 described above in FIGS. 22-24, may not use ink layer 290.

One example of an ink material as described above includes 10-30% by weight Triacrylate Monomer; 10-30% by weight Acrylate Oligomer; 1-5% by weight Hydroxycyclohccyl, 1-Phenyl Kclone; 1-5% by weight 1-Propanone, 2-methyl-1[4-(methylthio) phenyl]-2-(4-morpholinyl)-; 1-5% by weight Photoinitiator; and 1-5% by weight Pentacrythritol Tetraacrylate made by INX International Ink Co., 651 Bonnie Lane, Elk Grove Village, Ill. 60007.

Another ink material uses Monomeric Multifunctional Acrylates; Multi-Functional Acrylate Ester; Benzophenone; Acrylate Ester of Bisphenol-A-Epoxy; Multifunctional Acrylate; Isopropyl Alcohol; Inorganic filler; and Ketone type photo-initiator. Of course are just examples and other types of ink materials could also be used.

Figure 26:
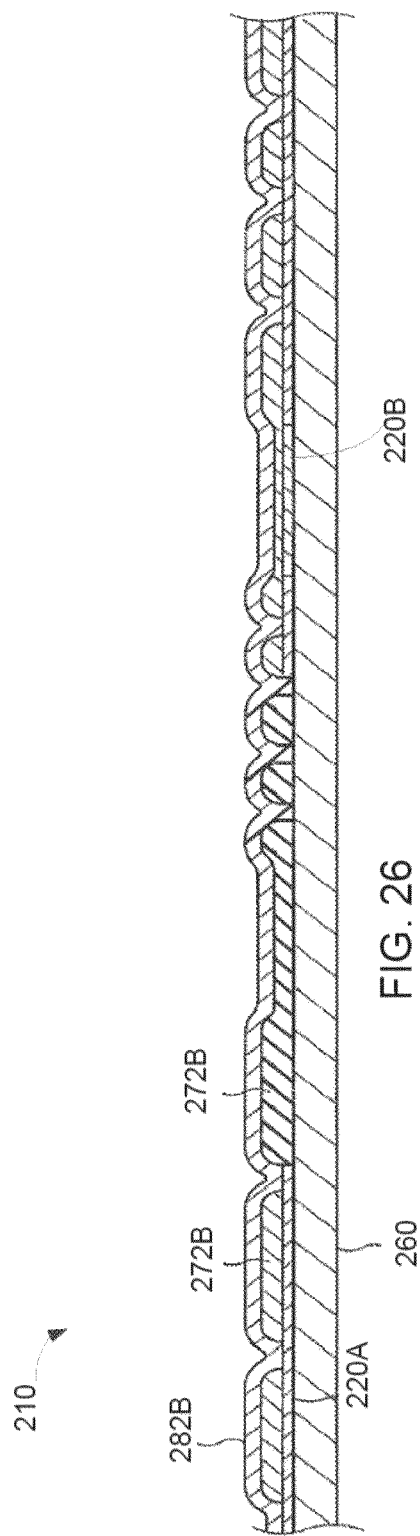

FIG. 26 shows resin layers 272B and 282B applied on top of ink layers 220A and 220B. Resin layers 272B and 282B are applied in the same manner described above in FIGS. 22-24. In one example ink layers 220A and 220B may have different colors and shapes and may use different dichroic pigments and/or UV inhibitors. In another example, polymeric layer 260, resin layer 272B, and/or resin layer 282B also may include UV absorbing inhibitors.

The processes described above are only examples of a combination of textures that are created on the polymeric film. It should also be understood that limitless combinations of screens, emulsion and resin materials can be used to create different textured surfaces. For example, the different patterns on the screen meshes, the thread counts (mesh count) on the screen meshes and the thickness of the emulsions and resins applied to the screens can all be varied to create different textured line patterns with different thicknesses and shapes.

A screen with a lower thread count per inch produces a coarser mesh that allows more of the resin to pass through onto the polymeric substrate. This can produce different shapes and heights of the bumps and line patterns on the textured surface. In one example, if was discovered that bumps with a height of around 4/1000 of an inch (4 mils) produced a highly effective light disturbance. These different bump and line heights in combination with the textured surface pattern and any ink pattern applied during the process can create a limitless combination of reflection and refraction characteristics.

Installation

Another advantage of the process described above is the ease that the anti-collision film 210 can be applied to and removed from the inside of a window. For example, the smooth/flat contact of polymeric film 260 allows the anti-collision film 210 to be applied without the use of adhesive materials. Anti-collision film 210 is held to the window surface by cohesion and atmospheric pressure. While this is one embodiment, other embodiments of anti-collision film 210 can apply an adhesive material to the window contact surface.

Anti-collision film 210 in one embodiment is thicker than conventional widow films. This makes film 210 more resilient to bending and creasing and in general makes the material easier to work with. The polymeric substrate and resin layers in combination with any applied ink also have a flexible and stretchable characteristic that further prevent film 210 from cracking and otherwise being damaged during application or removal from a window. The materials described above for forming anti-collision film 210 also do not require any special cleaning process. Thus, conventional window cleaners can be used.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. An apparatus, comprising:
   a textured window film, including:
      a plurality of light-transmissive layers including:
         a vinyl film layer,
         a patterned layer formed on a top surface of the vinyl film layer, the patterned layer forming discrete bumps that cover at least some areas of the top surface of the vinyl film layer, wherein the discrete bumps have different sizes, shapes, or spacing to produce different prismatic refraction effects and are grouped based on size or shape into at least a first area having a first prismatic characteristic and a second area having a second prismatic characteristic that is different than the first prismatic characteristic; and
      an additional layer disposed over the discrete bumps and over the uncovered areas of the top surface of the vinyl film layer.

2. The apparatus of claim 1, wherein a surface of the additional layer is non-planar.

3. The apparatus of claim 2, wherein the additional layer comprises a resin layer.

4. The apparatus of claim 1, wherein the vinyl film layer is between 0.5-10 mils thick and the discrete bumps are approximately 0.5-5.0 mils thick.

5. The apparatus of claim 1, wherein an ink layer is located on the top surface of the vinyl layer.

6. The apparatus of claim 1, wherein the textured window film comprises a packaged textured window film, wherein the plurality of light-transmissive layers are held onto a packaging layer without adhesive and the plurality of light-transmissive layers is peelingly removable from the packaging layer.

7. The apparatus of claim 1, wherein the discrete bumps are grouped based on size, wherein one of the first and second areas contains smallest ones of the discrete bumps and the other of the first and second areas contains largest ones of the discrete bumps.

8. The apparatus of claim 1, wherein the discrete bumps are grouped based on shape, wherein one of the first and second areas contains ones of the discrete bumps having a particular shape and the other of the first and second areas contains ones of the discrete bumps without the particular shape.

9. An apparatus, comprising:
   a window film product, including:
      a packaging layer; and
      a plurality of light-transmissive layers held onto the packaging layer without adhesive, the plurality of light-transmissive layers peelingly removable from the packaging layer, the plurality of light-transmissive layers including:
         a polymeric film layer and a patterned layer formed on a top surface of the polymeric film layer, the patterned layer forming discrete bumps that cover at least some areas of the top surface of the polymeric film layer, wherein the discrete bumps have different sizes, shapes, or spacing to produce different prismatic refraction effects and are grouped based on size or shape into at least a first area having a first prismatic characteristic and a second area having a second prismatic characteristic that is different than the first prismatic characteristic.

10. The apparatus of claim 9, further comprising:
   an additional light-transmissive layer formed on the plurality of light-transmissive layers, wherein a surface of the additional light-transmissive layer is non-planar.

11. The apparatus of claim 10, wherein the additional light-transmissive layer comprises a resin layer.

12. The apparatus of claim 9, wherein the polymeric film layer is between 0.5-10 mils thick and the discrete bumps are approximately 0.5-5.0 mils thick.

13. The apparatus of claim 9, wherein a surface area of the top surface of the polymeric film layer is greater than a surface area of a planar side of the patterned layer.

14. The apparatus of claim 9, an ink layer is located on the top surface of the polymeric film layer.

15. The apparatus of claim 9, wherein one of the first and second areas is contained within a part of the plurality of light-transmissive layers to pass light of a first color.

16. The apparatus of claim 15, wherein the other of the first and second areas is contained within a part of the plurality of light-transmissive layers to pass light of a second color that is different than the first color.

\* \* \* \* \*